(12) United States Patent
Nemet et al.

(10) Patent No.: US 11,614,370 B2
(45) Date of Patent: *Mar. 28, 2023

(54) ELECTRONIC QUALITY INDICATOR

(71) Applicant: Varcode Ltd., Raanana (IL)

(72) Inventors: Yaron Nemet, Kdumim (IL); Rafael Ben Shahar, Kdumim (IL); Eyal Koren, Moshav Harut (IL)

(73) Assignee: Varcode Ltd., Rosh Ha'ayin (IL)

( * ) Notice: Subject to any disclaimer, the term of this patent is extended or adjusted under 35 U.S.C. 154(b) by 39 days.

This patent is subject to a terminal disclaimer.

(21) Appl. No.: 17/314,295

(22) Filed: May 7, 2021

(65) Prior Publication Data

US 2021/0333159 A1    Oct. 28, 2021

Related U.S. Application Data

(63) Continuation of application No. 16/895,001, filed on Jun. 8, 2020, now Pat. No. 11,009,406, which is a (Continued)

(51) Int. Cl.
| | |
|---|---|
| *G01K 11/12* | (2021.01) |
| *G01K 1/02* | (2021.01) |
| *G01K 3/00* | (2006.01) |
| *G01D 7/00* | (2006.01) |
| *G01N 31/22* | (2006.01) |
| *G01K 3/04* | (2006.01) |
| *G01K 7/22* | (2006.01) |

(52) U.S. Cl.
CPC ............ *G01K 11/12* (2013.01); *G01D 7/005* (2013.01); *G01K 1/02* (2013.01); *G01K 3/005* (2013.01); *G01K 3/04* (2013.01); *G01K 7/22* (2013.01); *G01N 31/229* (2013.01)

(58) Field of Classification Search
USPC .................................................. 374/208, 162
See application file for complete search history.

(56) References Cited

U.S. PATENT DOCUMENTS

| | | | |
|---|---|---|---|
| 4,057,029 A | 11/1977 | Seiter | |
| 4,059,407 A | 11/1977 | Hochstrasser | |

(Continued)

FOREIGN PATENT DOCUMENTS

| | | |
|---|---|---|
| CN | 1720180 | 1/2006 |
| CN | 1914621 | 2/2007 |

(Continued)

OTHER PUBLICATIONS

A Notice of Allowance dated Apr. 2, 2013, which issued during the prosecution of U.S. Appl. No. 12/743,209.

(Continued)

*Primary Examiner* — Mirellys Jagan
(74) *Attorney, Agent, or Firm* — Fish & Richardson P.C.

(57) ABSTRACT

A visually sensible indicator of temperature including electronic temperature sensing circuitry sensing at least when a temperature exceeds at least one predetermined temperature threshold and providing at least one corresponding threshold exceedance output which is sensible as heat and a heat-responsive visually sensible display which is responsive to the at least one threshold exceedance output for providing at least one visually sensible indication indicating that the temperature has exceeded the predetermined temperature threshold.

12 Claims, 10 Drawing Sheets

Related U.S. Application Data continuation of application No. 15/742,181, filed as application No. PCT/IL2016/050727 on Jul. 7, 2016, now Pat. No. 10,697,837.

(60) Provisional application No. 62/189,367, filed on Jul. 7, 2015.

(56) References Cited

U.S. PATENT DOCUMENTS

| | | | |
|---|---|---|---|
| RE31,586 | E | 5/1984 | Magnussen |
| 4,674,065 | A | 6/1987 | Lange et al. |
| 5,053,339 | A | 10/1991 | Patel |
| 5,084,143 | A | 1/1992 | Smith |
| 5,085,802 | A | 2/1992 | Jalinski |
| 5,146,405 | A | 9/1992 | Church et al. |
| 5,202,677 | A | 4/1993 | Parker et al. |
| 5,254,473 | A | 10/1993 | Patel |
| 5,369,577 | A | 11/1994 | Kadashevich et al. |
| 5,451,932 | A | 9/1995 | Wunderlich et al. |
| 5,485,372 | A | 1/1996 | Golding et al. |
| 5,499,597 | A | 3/1996 | Kronberg |
| 5,591,952 | A | 1/1997 | Krichever |
| 5,600,119 | A | 2/1997 | Dvorkis |
| 5,617,488 | A | 4/1997 | Hong et al. |
| 5,634,195 | A | 5/1997 | Sawyer |
| 5,659,771 | A | 8/1997 | Golding |
| 5,752,227 | A | 5/1998 | Lyberg |
| 5,805,245 | A | 9/1998 | Davis |
| 5,822,728 | A | 10/1998 | Applebaum et al. |
| 5,828,991 | A | 10/1998 | Skiena et al. |
| 5,841,285 | A | 11/1998 | Bailey |
| 5,882,116 | A | 3/1999 | Backus |
| 5,895,075 | A | 4/1999 | Edwards |
| 5,899,973 | A | 5/1999 | Bandara et al. |
| 5,902,982 | A | 5/1999 | Lappe |
| 5,907,839 | A | 5/1999 | Roth |
| 5,936,508 | A | 8/1999 | Parker |
| 5,956,739 | A | 9/1999 | Golding et al. |
| 6,006,221 | A | 12/1999 | Liddy et al. |
| 6,009,400 | A | 12/1999 | Blackman |
| 6,036,092 | A | 3/2000 | Lappe |
| 6,085,206 | A | 7/2000 | Domini et al. |
| 6,098,034 | A | 8/2000 | Razin et al. |
| 6,154,722 | A | 11/2000 | Bellegarda |
| 6,173,261 | B1 | 1/2001 | Arai et al. |
| 6,190,610 | B1 | 2/2001 | Goldsmith et al. |
| 6,214,623 | B1 | 4/2001 | Simons et al. |
| 6,272,242 | B1 | 8/2001 | Saitoh et al. |
| 6,293,470 | B1 | 9/2001 | Asplund |
| 6,314,400 | B1 | 11/2001 | Klakow |
| 6,335,922 | B1 | 1/2002 | Tiedemann et al. |
| 6,366,759 | B1 | 4/2002 | Burstein et al. |
| 6,424,983 | B1 | 7/2002 | Schabes et al. |
| 6,456,972 | B1 | 9/2002 | Gladstein et al. |
| 6,479,016 | B1 | 11/2002 | Goldsmith |
| 6,495,368 | B1 | 12/2002 | Wallach |
| 6,544,925 | B1 | 4/2003 | Prusik et al. |
| 6,685,094 | B2 | 2/2004 | Cameron |
| 6,698,272 | B1 | 3/2004 | Almirante |
| 6,751,584 | B2 | 6/2004 | Bangalore |
| 6,758,397 | B2 | 7/2004 | Catan |
| 6,920,420 | B2 | 7/2005 | Lin |
| 6,982,640 | B2 | 1/2006 | Lindsay |
| 7,017,806 | B2 | 3/2006 | Peterson |
| 7,020,338 | B1 | 3/2006 | Cumbee |
| 7,030,863 | B2 | 4/2006 | Longe et al. |
| 7,053,777 | B2 | 5/2006 | Allen |
| 7,054,293 | B2 | 5/2006 | Tiedemann et al. |
| 7,057,495 | B2 | 6/2006 | Debord |
| RE39,226 | E | 8/2006 | Lappe |
| 7,092,567 | B2 | 8/2006 | Ma et al. |
| RE39,266 | E | 9/2006 | Lohray et al. |
| 7,117,144 | B2 | 10/2006 | Goodman et al. |
| 7,156,597 | B2 | 1/2007 | Goldsmith et al. |
| 7,157,048 | B2 | 1/2007 | Goldsmith et al. |
| 7,165,019 | B1 | 1/2007 | Lee et al. |
| 7,166,345 | B2 | 1/2007 | Myers |
| 7,184,950 | B2 | 2/2007 | Weise |
| 7,224,346 | B2 | 5/2007 | Sheng |
| 7,262,792 | B2 | 8/2007 | Shniberg |
| 7,277,088 | B2 | 10/2007 | Robinson et al. |
| 7,295,965 | B2 | 11/2007 | Haigh et al. |
| 7,295,968 | B2 | 11/2007 | Bietrix et al. |
| 7,296,019 | B1 | 11/2007 | Chandrasekar et al. |
| 7,340,388 | B2 | 3/2008 | Soricut |
| 7,386,442 | B2 | 6/2008 | Dehlinger et al. |
| 7,457,808 | B2 | 11/2008 | Gaussier |
| 7,475,015 | B2 | 1/2009 | Epstein et al. |
| 7,558,725 | B2 | 7/2009 | Greenwald et al. |
| 7,562,811 | B2 | 7/2009 | Nemet et al. |
| 7,584,093 | B2 | 9/2009 | Potter et al. |
| 7,587,217 | B1 | 9/2009 | Laakso et al. |
| 7,590,626 | B2 | 9/2009 | Li et al. |
| 7,702,680 | B2 | 4/2010 | Yih et al. |
| 7,747,427 | B2 | 6/2010 | Lee et al. |
| 7,813,916 | B2 | 10/2010 | Bean |
| 7,917,355 | B2 | 3/2011 | Wu et al. |
| 8,005,664 | B2 | 8/2011 | Hanumanthappa |
| 8,091,776 | B2 | 1/2012 | Nemet |
| 8,196,821 | B2 | 6/2012 | Nemet |
| 8,242,466 | B2 | 8/2012 | Uber |
| 8,259,144 | B2 | 9/2012 | Hillis et al. |
| 8,271,266 | B2 | 9/2012 | Gallagher et al. |
| 8,321,786 | B2 | 11/2012 | Lunati |
| 8,341,520 | B2 | 12/2012 | Iakobashvili et al. |
| 8,365,070 | B2 | 1/2013 | Song et al. |
| 8,473,278 | B2 | 6/2013 | Futagi et al. |
| 8,500,014 | B2 | 8/2013 | Nemet et al. |
| 8,528,808 | B2 | 9/2013 | Nemet |
| 8,540,156 | B2 | 9/2013 | Nemet |
| 8,579,193 | B2 | 11/2013 | Nemet |
| 8,626,786 | B2 | 1/2014 | Halcrow et al. |
| 8,757,503 | B2 | 6/2014 | Conzelmann |
| 8,807,422 | B2 | 8/2014 | Nemet |
| 8,950,664 | B2 | 2/2015 | Nemet et al. |
| 8,960,534 | B2 | 2/2015 | Nemet et al. |
| 8,967,467 | B2 | 3/2015 | Nemet et al. |
| 9,122,963 | B2 | 9/2015 | Nemet |
| 9,135,544 | B2 | 9/2015 | Nemet et al. |
| 9,317,794 | B2 | 4/2016 | Nemet et al. |
| 9,349,086 | B2 | 5/2016 | Nemet et al. |
| 9,373,100 | B2 | 6/2016 | Nemet et al. |
| 9,384,435 | B2 | 7/2016 | Nemet et al. |
| 9,396,423 | B2 | 7/2016 | Nemet et al. |
| 9,400,952 | B2 | 7/2016 | Nemet |
| 9,558,439 | B2 | 1/2017 | Nemet et al. |
| 9,626,610 | B2 | 4/2017 | Nemet et al. |
| 9,633,296 | B2 | 4/2017 | Nemet |
| 9,646,237 | B2 | 5/2017 | Nemet et al. |
| 9,646,277 | B2 | 5/2017 | Nemet et al. |
| 9,710,743 | B2 | 7/2017 | Nemet et al. |
| 10,049,314 | B2 | 8/2018 | Nemet et al. |
| 10,089,566 | B2 | 10/2018 | Nemet |
| 10,697,837 | B2 | 6/2020 | Nemet et al. |
| 11,009,406 | B2 | 5/2021 | Nemet et al. |
| 2002/0012332 | A1 | 1/2002 | Tiedemann et al. |
| 2002/0032564 | A1 | 3/2002 | Eshani et al. |
| 2002/0056756 | A1 | 5/2002 | Cameron et al. |
| 2002/0128821 | A1 | 9/2002 | Ehsani |
| 2002/0169595 | A1 | 11/2002 | Agichtein et al. |
| 2003/0136503 | A1 | 7/2003 | Green et al. |
| 2003/0187632 | A1 | 10/2003 | Menich |
| 2003/0204569 | A1 | 10/2003 | Andrews et al. |
| 2003/0210249 | A1 | 11/2003 | Simske |
| 2003/0227392 | A1 | 12/2003 | Ebert |
| 2003/0233222 | A1 | 12/2003 | Soricut et al. |
| 2004/0002849 | A1 | 1/2004 | Zhou |
| 2004/0018641 | A1 | 1/2004 | Goldsmith et al. |
| 2004/0030540 | A1 | 2/2004 | Ovil et al. |
| 2004/0093567 | A1 | 5/2004 | Schabes et al. |
| 2004/0138869 | A1 | 7/2004 | Heinecke |
| 2004/0215514 | A1 | 10/2004 | Devlin |
| 2004/0260543 | A1 | 12/2004 | Horowitz |

(56) References Cited

U.S. PATENT DOCUMENTS

| | | |
|---|---|---|
| 2005/0043940 A1 | 2/2005 | Elder |
| 2005/0044495 A1 | 2/2005 | Lee et al. |
| 2005/0053900 A1 | 3/2005 | Kaufmann |
| 2005/0091030 A1 | 4/2005 | Jessee et al. |
| 2005/0091088 A1 | 4/2005 | Peterson |
| 2005/0108001 A1 | 5/2005 | Aarskog |
| 2005/0120002 A1 | 6/2005 | Behbehani |
| 2005/0139686 A1 | 6/2005 | Helmer et al. |
| 2005/0143971 A1 | 6/2005 | Burstein |
| 2005/0162274 A1 | 7/2005 | Shniberg et al. |
| 2005/0209844 A1 | 9/2005 | Wu et al. |
| 2005/0257146 A1 | 11/2005 | Ashcraft et al. |
| 2006/0003297 A1 | 1/2006 | Wiig et al. |
| 2006/0032427 A1 | 2/2006 | Ishii et al. |
| 2006/0048055 A1 | 3/2006 | Wu et al. |
| 2006/0057022 A1 | 3/2006 | Williams |
| 2006/0060657 A1 | 3/2006 | Choong et al. |
| 2006/0074655 A1 | 4/2006 | Bejar et al. |
| 2006/0081711 A1 | 4/2006 | Zhao et al. |
| 2006/0110714 A1 | 5/2006 | Symmes |
| 2006/0129381 A1 | 6/2006 | Wakita |
| 2006/0247914 A1 | 11/2006 | Brener et al. |
| 2006/0260958 A1 | 11/2006 | Brunner |
| 2007/0067177 A1 | 3/2007 | Martin |
| 2007/0094024 A1 | 4/2007 | Kristensson et al. |
| 2007/0106937 A1 | 5/2007 | Cucerzan et al. |
| 2007/0141544 A1 | 6/2007 | Nakane |
| 2007/0238084 A1 | 10/2007 | Maguire et al. |
| 2007/0241916 A1 | 10/2007 | Hedtke |
| 2007/0265831 A1 | 11/2007 | Dinur et al. |
| 2007/0271089 A1 | 11/2007 | Bates et al. |
| 2008/0059151 A1 | 3/2008 | Chen |
| 2008/0077859 A1 | 3/2008 | Schabes et al. |
| 2008/0154600 A1 | 6/2008 | Tian et al. |
| 2008/0167858 A1 | 7/2008 | Christie et al. |
| 2008/0173712 A1 | 7/2008 | Nemet |
| 2008/0189106 A1 | 8/2008 | Low et al. |
| 2008/0195940 A1 | 8/2008 | Gail et al. |
| 2008/0208567 A1 | 8/2008 | Brockett et al. |
| 2008/0208582 A1 | 8/2008 | Gallino |
| 2008/0249773 A1 | 10/2008 | Bejar et al. |
| 2008/0270897 A1 | 10/2008 | Jawerth et al. |
| 2009/0083028 A1 | 3/2009 | Davtchev et al. |
| 2009/0198671 A1 | 8/2009 | Zhang |
| 2009/0228467 A1 | 9/2009 | Asanuma |
| 2009/0230182 A1 | 9/2009 | Nemet et al. |
| 2009/0302102 A1 | 12/2009 | Nemet et al. |
| 2009/0319257 A1 | 12/2009 | Blume et al. |
| 2009/0320742 A1 | 12/2009 | Leute et al. |
| 2010/0020970 A1 | 1/2010 | Liu |
| 2010/0050074 A1 | 2/2010 | Nachmani et al. |
| 2010/0219235 A1 | 9/2010 | Nemet et al. |
| 2010/0269454 A1 | 10/2010 | Reddersen et al. |
| 2010/0275118 A1 | 10/2010 | Iakobashvili et al. |
| 2010/0286979 A1 | 11/2010 | Zangvil et al. |
| 2011/0006109 A1 | 1/2011 | Nemet |
| 2011/0006115 A1 | 1/2011 | Nemet |
| 2011/0093268 A1 | 4/2011 | Gorin et al. |
| 2011/0184720 A1 | 7/2011 | Zangvil |
| 2012/0104105 A1 | 5/2012 | Nemet |
| 2012/0104106 A1 | 5/2012 | Nemet |
| 2012/0145781 A1 | 6/2012 | Nemet |
| 2012/0305637 A1 | 12/2012 | Nemet |
| 2013/0024185 A1 | 1/2013 | Parikh |
| 2013/0074248 A1 | 3/2013 | Evans et al. |
| 2013/0138641 A1 | 5/2013 | Korolev et al. |
| 2013/0334301 A1 | 12/2013 | Nemet et al. |
| 2014/0001256 A1 | 1/2014 | Nemet et al. |
| 2014/0110486 A1 | 4/2014 | Nemet |
| 2014/0252096 A1 | 9/2014 | Nemet et al. |
| 2014/0353385 A1 | 12/2014 | Nemet |
| 2014/0360269 A1 | 12/2014 | Burghardt et al. |
| 2015/0047552 A1 | 2/2015 | Ortais |
| 2015/0053776 A1 | 2/2015 | Nemet et al. |
| 2015/0100105 A1 | 4/2015 | Kiani et al. |
| 2015/0122880 A1 | 5/2015 | Nemet et al. |
| 2015/0168223 A1 | 6/2015 | Hammond et al. |
| 2015/0193677 A1 | 7/2015 | Nemet et al. |
| 2015/0220877 A1 | 8/2015 | Nemet et al. |
| 2016/0042260 A1 | 2/2016 | Nemet |
| 2016/0071000 A1 | 3/2016 | Nemet et al. |
| 2016/0239781 A1 | 8/2016 | Nemet et al. |
| 2016/0275390 A1 | 9/2016 | Nemet et al. |
| 2016/0292554 A1 | 10/2016 | Nemet et al. |
| 2016/0371576 A1 | 12/2016 | Nemet et al. |
| 2016/0371577 A1 | 12/2016 | Nemet |
| 2016/0371635 A1 | 12/2016 | Nemet et al. |
| 2017/0177987 A1 | 6/2017 | Nemet et al. |
| 2017/0262782 A1 | 9/2017 | Nemet et al. |
| 2017/0270396 A1 | 9/2017 | Nemet |
| 2017/0277988 A1 | 9/2017 | Nemet et al. |
| 2017/0300791 A1 | 10/2017 | Nemet et al. |
| 2018/0195908 A1 | 7/2018 | Nemet et al. |
| 2020/0370966 A1 | 11/2020 | Nemet et al. |

FOREIGN PATENT DOCUMENTS

| | | |
|---|---|---|
| CN | 101019157 | 8/2007 |
| CN | 100445711 | 12/2007 |
| CN | 101365934 | 2/2009 |
| CN | 204176727 | 2/2015 |
| EP | 936753 | 8/1999 |
| EP | 3320315 | 4/2020 |
| JP | S57-59293 | 4/1982 |
| JP | 63-094383 | 4/1988 |
| JP | 63-118894 | 5/1988 |
| JP | 3-53281 | 3/1991 |
| JP | 5-6470 | 1/1993 |
| JP | 5-19695 | 1/1993 |
| JP | 5-67253 | 3/1993 |
| JP | 9-504858 | 11/1994 |
| JP | 2006-522933 | 5/1997 |
| JP | 2001-502794 | 2/2001 |
| JP | 2002-40012 | 2/2002 |
| JP | 2002-504684 | 2/2002 |
| JP | 2003-203210 | 7/2003 |
| JP | 2003-525464 | 8/2003 |
| JP | 2005-518320 | 6/2005 |
| JP | 2006-18782 | 1/2006 |
| JP | 2007-121017 | 5/2007 |
| JP | 2004-184920 | 7/2007 |
| JP | 2008-089673 | 4/2008 |
| WO | WO 1994/027144 | 11/1994 |
| WO | WO 1994/027155 | 11/1994 |
| WO | WO 1997/011535 | 3/1997 |
| WO | WO 1998/014777 | 4/1998 |
| WO | WO 1998/035514 | 12/1998 |
| WO | WO 1999/042822 | 8/1999 |
| WO | WO 2001/048680 | 7/2001 |
| WO | WO 2001/064430 | 9/2001 |
| WO | WO 2003/060626 | 7/2003 |
| WO | WO 2004/038353 | 5/2004 |
| WO | WO 2004/038535 | 5/2004 |
| WO | WO 2004/092697 | 10/2004 |
| WO | WO 2006/086053 | 8/2006 |
| WO | WO 2006/134795 | 12/2006 |
| WO | WO 2007/049792 | 5/2007 |
| WO | WO 2008/022140 | 2/2008 |
| WO | WO 2009/016631 | 2/2009 |
| WO | WO 2007/129316 | 4/2009 |
| WO | WO 2008/135962 | 4/2009 |
| WO | WO 2009/063464 | 5/2009 |
| WO | WO 2009/063465 | 5/2009 |
| WO | WO 2009/144701 | 12/2009 |
| WO | WO 2009/150641 | 12/2009 |
| WO | WO 2010/013228 | 2/2010 |
| WO | WO 2010/134061 | 11/2010 |
| WO | WO 2010/134062 | 11/2010 |

(56) References Cited

FOREIGN PATENT DOCUMENTS

| WO | WO 2016/185474 | 11/2016 |
|----|----------------|---------|
| WO | WO 2017/006326 | 1/2017  |

OTHER PUBLICATIONS

A Notice of Allowance dated Apr. 17, 2009, which issued during the prosecution of U.S. Appl. No. 11/852,911.
A Notice of Allowance dated Apr. 23, 2014, which issued during the prosecution of U.S. Appl. No. 13/323,906.
A Notice of Allowance dated Apr. 25, 2014, which issued during the prosecution of U.S. Appl. No. 13/490,705.
A Notice of Allowance dated Apr. 26, 2013, which issued during the prosecution of U.S. Appl. No. 12/598,979.
A Notice of Allowance dated Aug. 4, 2014, which issued during the prosecution of U.S. Appl. No. 12/669,175.
A Notice of Allowance dated Dec. 14, 2016, which issued during the prosecution of U.S. Appl. No. 15/189,127.
A Notice of Allowance dated Dec. 8, 2015, which issued during the prosecution of U.S. Appl. No. 14/055,422.
A Notice of Allowance dated Feb. 15, 2012, which issued during the prosecution of U.S. Appl. No. 12/471,798.
A Notice of Allowance dated Feb. 2, 2016, which issued during the prosecution of U.S. Appl. No. 14/595,412.
A Notice of Allowance dated Feb. 25, 2009, which issued during the prosecution of U.S. Appl. No. 11/852,911.
A Notice of Allowance dated Feb. 27, 2020, which issued during the prosecution of U.S. Appl. No. 15/742,181.
A Notice of Allowance dated Feb. 4, 2016, which issued during the prosecution of U.S. Appl. No. 14/595,395.
A Notice of Allowance dated Jan. 18, 2017, which issued during the prosecution of U.S. Appl. No. 15/137,316.
A Notice of Allowance dated Jan. 22, 2021, which issued during the prosecution of U.S. Appl. No. 16/895,001.
A Notice of Allowance dated Jul. 11, 2013, which issued during the prosecution of U.S. Appl. No. 13/321,477.
A Notice of Allowance dated Jun. 27, 2014, which issued during the prosecution of U.S. Appl. No. 14/017,545.
A Notice of Allowance dated Mar. 16, 2016, which issued during the prosecution of U.S. Appl. No. 14/595,954.
A Notice of Allowance dated Mar. 23, 2016, which issued during the prosecution of U.S. Appl. No. 14/823,758.
A Notice of Allowance dated Mar. 3, 2016, which issued during the prosecution of U.S. Appl. No. 14/528,186.
A Notice of Allowance dated May 16, 2013, which issued during the prosecution of U.S. Appl. No. 12/742,650.
A Notice of Allowance dated Nov. 7, 2014, which issued during the prosecution of U.S. Appl. No. 13/490,705.
A Notice of Allowance dated Nov. 18, 2014, which issued during the prosecution of U.S. Appl. No. 13/323,906.
A Notice of Allowance dated Oct. 11, 2016, which issued during the prosecution of U.S. Appl. No. 14/823,702.
A Notice of Allowance dated Oct. 15, 2014, which issued during the prosecution of U.S. Appl. No. 14/017,545.
A Notice of Allowance dated Oct. 26, 2016, which issued during the prosecution of U.S. Appl. No. 15/189,127.
A Notice of Allowance dated Sep. 9, 2011, which issued during the prosecution of U.S. Appl. No. 12/469,309.
A Supplementary European Search Report dated Apr. 13, 2011, which issued during the prosecution of European Patent Application No. 07827384.
A Supplementary European Search Report dated Aug. 23, 2012, which issued during the prosecution of European Patent Application No. 08849330.9.
A Supplementary European Search Report dated Jul. 5, 2012, which issued during the prosecution of European Patent Application No. 08789727.
A Supplementary European Search Report dated Sep. 23, 2015, which issued during the prosecution of European Patent Application No. 10777451.5.
An English Summary of an Office Action dated Dec. 9, 2019 which issued during the prosecution of Chinese Patent Application No. 201680039584.0.
An English Summary of an Office Action dated Jun. 24, 2019 which issued during the prosecution of Chinese Patent Application No. 201680039584.0.
An English Translation of an Office Action dated Apr. 19, 2015 which issued during the prosecution of Israeli Patent Application No. 216396.
An English Translation of an Office Action dated Apr. 20, 2015 which issued during the prosecution of Israeli Patent Application No. 216397.
An English Translation of an Office Action dated Apr. 22, 2014 which issued during the prosecution of Israeli Patent Application No. 205687.
An English Translation of an Office Action dated Apr. 28, 2012 which issued during the prosecution of Chinese Patent Application No. 200880101405.7.
An English translation of an Office Action dated Aug. 18, 2020 which issued during the prosecution of Japanese Patent Application No. 2018-500482.
An English translation of an Office Action dated Aug. 26, 2014 which issued during the prosecution of Japanese Patent Application No. 2012-511407.
An English translation of an Office Action dated Aug. 27, 2013 which issued during the prosecution of Japanese Patent Application No. 2010-507054.
An English translation of an Office Action dated Aug. 27, 2015 which issued during the prosecution of Japanese Patent Application No. 2014-218223.
An English translation of an Office Action dated Dec. 12, 2017, which issued during the prosecution of Japanese Patent Application No. 2014-125707.
An English Translation of an Office Action dated Dec. 24, 2013 which issued during the prosecution of Chinese Patent Application No. 200980160387.4.
An English Translation of an Office Action dated Dec. 31, 2015 which issued during the prosecution of Israeli Patent Application No. 209901.
An English translation of an Office Action dated Feb. 3, 2014 which issued during the prosecution of Japanese Patent Application No. 2012-511407.
An English Translation of an Office Action dated Feb. 18, 2014 which issued during the prosecution of Japanese Patent Application No. JP2009-508663.
An English Translation of an Office Action dated Feb. 26, 2013 which issued during the prosecution of Japanese Patent Application No. JP2009-508663.
An English Translation of an Office Action dated Feb. 7, 2012 which issued during the prosecution of Japanese Patent Application No. JP2009-508663.
An English Translation of an Office Action dated Jan. 15, 2013 which issued during the prosecution of Japanese Patent Application No. JP2010-507054.
An English Translation of an Office Action dated Jan. 25, 2013 which issued during the prosecution of Chinese Patent Application No. 200880101405.7.
An English Translation of an Office Action dated Jan. 6, 2014 which issued during the prosecution of Chinese Patent Application No. 201080030956.6.
An English translation of an Office Action dated Jul. 28, 2015 which issued during the prosecution of Japanese Patent Application No. 2014-125707.
An English Translation of an Office Action dated Jun. 13, 2014 which issued during the prosecution of Chinese Patent Application No. 200880101405.7.
An English translation of an Office Action dated Jun. 14, 2016 which issued during the prosecution of Japanese Patent Application No. 2014-125707.

(56) References Cited

OTHER PUBLICATIONS

An English Translation of an Office Action dated Jun. 23, 2011 which issued during the prosecution of Chinese Patent Application No. 200880101405.7.
An English translation of an Office Action dated Jun. 25, 2013 which issued during the prosecution of Japanese Patent Application No. 2012-511406.
An English translation of an Office Action dated Mar. 15, 2016, which issued during the prosecution of Japanese Patent Application No. 2014-218223.
An English Translation of an Office Action dated May 22, 2015 which issued during the prosecution of Chinese Patent Application No. 200980160387.4.
An English Translation of an Office Action dated Nov. 15, 2014 which issued during the prosecution of Chinese Patent Application No. 200980160387.4.
An English translation of an Office Action dated Nov. 2, 2016, which issued during the prosecution of Japanese Patent Application No. 2014-125707.
An English Translation of an Office Action dated Nov. 4, 2014 which issued during the prosecution of Chinese Patent Application No. 201080030956.6.
An English Translation of an Office Action dated Oct. 25, 2012 which issued during the prosecution of Israeli Patent Application No. 201958.
An English Translation of an Office Action dated Oct. 27, 2014 which issued during the prosecution of Israeli Patent Application No. 209901.
An English translation of an Office Action dated Sep. 10, 2013 which issued during the prosecution of Japanese Patent Application No. 2011-513110.
An Examiner Interview Summary Report dated Nov. 7, 2008, which issued during the prosecution of U.S. Appl. No. 11/852,911.
An Extended European Search Report dated Feb. 11, 2013, which issued during the prosecution of European Patent Application No. 08848845.
An Extended European Search Report dated Feb. 18, 2013, which issued during the prosecution of European Application No. 09762166.
An International Preliminary Examination Report dated Oct. 19, 2010, which issued during the prosecution of Applicant's PCT/IL2009/00317.
An International Preliminary Report on Patentability dated Dec. 13, 2010, which issued during the prosecution of Applicant's PCT/IL2009/000503.
An International Preliminary Report on Patentability dated Jan. 9, 2018, which issued during the prosecution of Applicant's PCT/IL2016/050727.
An International Preliminary Report on Patentability dated Mar. 10, 2009, which issued during the prosecution of Applicant's PCTIL2007000547.
An International Preliminary Report on Patentability dated May 18, 2010, which issued during the prosecution of Applicant's PCT/IL2008/001494.
An International Preliminary Report on Patentability dated May 18, 2010, which issued during the prosecution of Applicant's PCT/IL2008/001495.
An International Preliminary Report on Patentability dated Nov. 10, 2009, which issued during the prosecution of Applicant's PCT/IL2007/001411.
An International Preliminary Report on Patentability dated Nov. 22, 2011 which issued during the prosecution of Applicant's PCT/IL10/00205.
An International Preliminary Report on Patentability dated Nov. 22, 2011, which issued during the prosecution of Applicant's PCT/IL2009/001167.
An International Search Report and a Written Opinion both dated Apr. 5, 2010, which issued during the prosecution of Applicant's PCT/IL2009/001167.

An International Search Report and a Written Opinion both dated Aug. 31, 2009, which issued during the prosecution of Applicant's PCT/IL2009/000503.
An International Search Report and a Written Opinion both dated Dec. 12, 2016, which issued during the prosecution of Applicant's PCT/IL2016/050727.
An International Search Report and a Written Opinion both dated Jan. 9, 2009, which issued during the prosecution of Applicant's PCT/IL2007/001411.
An International Search Report and a Written Opinion both dated Jul. 17, 2008, which issued during the prosecution of Applicant's PCTIL2007000547.
An International Search Report and a Written Opinion both dated Jun. 3, 2009, which issued during the prosecution of Applicant's PCT/IL2008/001494.
An International Search Report and a Written Opinion both dated Jun. 8, 2010, which issued during the prosecution of Applicant's PCT/IL2010/000205.
An International Search Report and a Written Opinion both dated Mar. 9, 2009, which issued during the prosecution of Applicant's PCT/IL2008/001495.
An International Search Report and a Written Opinion both dated May 25, 2011, which issued during the prosecution of Applicant's PCT/IL2011/00088.
An International Search Report and a Written Opinion both dated Oct. 3, 2016, which issued during the prosecution of Applicant's PCT/IL2016/050526.
An International Search Report and Written Opinion both dated Feb. 3, 2009 which issued during the prosecution of Applicant's PCT/IL08/01051.
An International Search Report dated Jun. 26, 2009, which issued during the prosecution of Applicant's PCT/IL2009/00317.
An International Search Report dated May 11, 2009, which issued during the prosecution of Applicant's PCT/IL2009/00130.
An International Search Report dated May 25, 2011, which issued during the prosecution of Applicant's PCT/IL2011/00088.
An Office Action dated Apr. 19, 2011, which issued during the prosecution of U.S. Appl. No. 12/469,309.
An Office Action dated Apr. 25, 2012, which issued during the prosecution of U.S. Appl. No. 12/598,979.
An Office Action dated Aug. 5, 2013, which issued during the prosecution of U.S. Appl. No. 12/669,175.
An Office Action dated Aug. 14, 2015, which issued during the prosecution of U.S. Appl. No. 14/055,422.
An Office Action dated Dec. 11, 2018, which issued during the prosecution of U.S. Appl. No. 16/036,401.
An Office Action dated Dec. 13, 2016, which issued during the prosecution of U.S. Appl. No. 15/169,851.
An Office Action dated Dec. 19, 2012, which issued during the prosecution of U.S. Appl. No. 12/742,650.
An Office Action dated Dec. 19, 2017, which issued during the prosecution of U.S. Appl. No. 15/632,916.
An Office Action dated Dec. 4, 2015, which issued during the prosecution of U.S. Appl. No. 14/823,758.
An Office Action dated Feb. 5, 2013, which issued during the prosecution of U.S. Appl. No. 12/669,175.
An Office Action dated Feb. 11, 2015, which issued during the prosecution of U.S. Appl. No. 13/958,893.
An Office Action dated Feb. 26, 2019, which issued during the prosecution of U.S. Appl. No. 16/026,585.
An Office Action dated Jan. 10, 2014, which issued during the prosecution of European Patent Application No. 08848845.
An Office Action dated Jan. 16, 2013, which issued during the prosecution of U.S. Appl. No. 12/598,979.
An Office Action dated Jan. 2, 2018, which issued during the prosecution of U.S. Appl. No. 15/184,483.
An Office Action dated Jan. 21, 2015, which issued during the prosecution of U.S. Appl. No. 14/461,778.
An Office Action dated Jan. 24, 2017, which issued during the prosecution of Canadian Patent Application No. 2,762,894.
An Office Action dated Jan. 26, 2016, which issued during the prosecution of Canadian Patent Application No. 2762891.

(56) References Cited

OTHER PUBLICATIONS

An Office Action dated Jan. 29, 2016, which issued during the prosecution of U.S. Appl. No. 14/528,186.
An Office Action dated Jan. 29, 2016, which issued during the prosecution of U.S. Appl. No. 14/595,954.
An Office Action dated Jul. 1, 2014, which issued during the prosecution of U.S. Appl. No. 13/576,330.
An Office Action dated Jul. 12, 2013, which issued during the prosecution of European Patent Application No. 07736287.9.
An Office Action dated Jul. 26, 2017, which issued during the prosecution of U.S. Appl. No. 15/486,906.
An Office Action dated Jul. 27, 2017, which issued during the prosecution of U.S. Appl. No. 15/184,483.
An Office Action dated Jul. 28, 2015, which issued during the prosecution of U.S. Appl. No. 14/595,412.
An Office Action dated Jun. 5, 2014, which issued during the prosecution of U.S. Appl. No. 14/017,545.
An Office Action dated Jun. 20, 2008, which issued during the prosecution of U.S. Appl. No. 11/852,911.
An Office Action dated Jun. 27, 2016, which issued during the prosecution of U.S. Appl. No. 14/823,702.
An Office Action dated Jun. 28, 2017, which issued during the prosecution of U.S. Appl. No. 15/495,022.
An Office Action dated Jun. 29, 2017, which issued during the prosecution of U.S. Appl. No. 15/398,951.
An Office Action dated Mar. 7, 2014, which issued during the prosecution of U.S. Appl. No. 12/669,175.
An Office Action dated Mar. 9, 2012, which issued during the prosecution of U.S. Appl. No. 12/743,209.
An Office Action dated Mar. 15, 2013, which issued during the prosecution of U.S. Appl. No. 13/321,467.
An Office Action dated Mar. 20, 2012, which issued during the prosecution of U.S. Appl. No. 13/321,477.
An Office Action dated Mar. 6, 2015, which issued during the prosecution of U.S. Appl. No. 14/055,422.
An Office Action dated May 3, 2011, which issued during the prosecution of U.S. Appl. No. 12/471,798.
An Office Action dated May 9, 2013, which issued during the prosecution of U.S. Appl. No. 12/937,618.
An Office Action dated May 5, 2016, which issued during the prosecution of Canadian Patent Application No. 2,762,894.
An Office Action dated Nov. 4, 2013, which issued during the prosecution of U.S. Appl. No. 13/323,906.
An Office Action dated Nov. 7, 2011, which issued during the prosecution of U.S. Appl. No. 12/598,979.
An Office Action dated Nov. 7, 2012, which issued during the prosecution of U.S. Appl. No. 12/743,209.
An Office Action dated Nov. 19, 2013, which issued during the prosecution of European Application No. 07827384.4.
An Office Action dated Nov. 22, 2019, which issued during the prosecution of U.S. Appl. No. 15/742,181.
An Office Action dated Nov. 23, 2016, which issued during the prosecution of U.S. Appl. No. 15/063,804.
An Office Action dated Nov. 27, 2017, which issued during the prosecution of U.S. Appl. No. 15/587,684.
An Office Action dated Oct. 11, 2016, which issued during the prosecution of U.S. Appl. No. 15/184,483.
An Office Action dated Oct. 12, 2012, which issued during the prosecution of U.S. Appl. No. 12/669,175.
An Office Action dated Oct. 15, 2020, which issued during the prosecution of U.S. Appl. No. 16/895,001.
An Office Action dated Oct. 28, 2013, which issued during the prosecution of U.S. Appl. No. 14/017,545.
An Office Action dated Sep. 9, 2011, which issued during the prosecution of U.S. Appl. No. 12/471,798.
An Office Action dated Sep. 10, 2013, which issued during the prosecution of U.S. Appl. No. 13/657,185.
An Office Action dated Sep. 18, 2014, which issued during the prosecution of U.S. Appl. No. 14/143,827.
An Office Action dated Sep. 25, 2014, which issued during the prosecution of U.S. Appl. No. 14/461,778.
An Office Action dated Sep. 26, 2017, which issued during the prosecution of U.S. Appl. No. 15/488,943.
An Office Action dated Sep. 27, 2016, which issued during the prosecution of U.S. Appl. No. 15/189,127.
An Office Action together with an English Summary dated Dec. 9, 2019, which issued during the prosecution of Chinese Patent Application No. 201680039584.0.
An Office Action together with the English translation dated Sep. 5, 2017, which issued during the prosecution of Japanese Patent Application No. 2016-200656.
Bick, E., "A Constraint Grammar Based Spellchecker for Danish with a Special Focus on Dyslexics" SKY Journal of Linguistics, vol. 19:2006 (ISSN 1796-279X), pp. 387-396 (retrieved Jan. 12, 2009 from the internet). <URL:http://www.ling.helsinki.fi/sky/julkaisut/SKY2006_1/1.6.1.%20BICK.pdf>.
CN Office Action in Chinese Appln. No. 201680039584.0, dated Jun. 24, 2019, 10 pages (with English summary).
European Search Report dated Aug. 18, 2011, which issued during the prosecution of European Patent Application No. 0 773 6287.
European Search Report dated Dec. 20, 2018, which issued during the prosecution of Applicant's European App No. 16796019.4.
European Search Report dated Feb. 11, 2019 which issued during the prosecution of Applicant's European App No. 16820959.1.
European Search Report dated Sep. 16, 2015, which issued during the prosecution of European Patent Application No. 09844849.
International Search Report of ISA/US for PCT/IL2016/050727 (dated Dec. 12, 2016).
Letter submitted on Jul. 17, 2009 in U.S. Appl. No. 11/852,911.
Notice of Allowance dated Apr. 14, 2014, which issued during the prosecution of U.S. Appl. No. 13/657,185,.
Notice of Allowance dated Aug. 3, 2017, which issued during the prosecution of U.S. Appl. No. 15/398,951.
Notice of Allowance dated Feb. 16, 2018, which issued during the prosecution of U.S. Appl. No. 15/486,906.
Notice of Allowance dated Jan. 4, 2018, which issued during the prosecution of U.S. Appl. No. 15/495,022.
Notice of Allowance dated Jan. 5, 2017, which issued during the prosecution of U.S. Appl. No. 15/183,465.
Notice of Allowance dated Jan. 9, 2019, which issued during the prosecution of U.S. Appl. No. 15/978,759.
Notice of Allowance dated Mar. 20, 2017, which issued during the prosecution of U.S. Appl. No. 15/063,804.
Notice of Allowance dated Mar. 23, 2017, which issued during the prosecution of U.S. Appl. No. 15/169,851.
Notice of Allowance dated May 13, 2015, which issued during the prosecution of U.S. Appl. No. 14/461,778.
Notice of Allowance dated May 29, 2015, which issued during the prosecution of U.S. Appl. No. 13/958,893.
U.S. Appl. No. 60/746,646, filed May 7, 2006.
U.S. Appl. No. 60/804,072, filed Jun. 6, 2006.
U.S. Appl. No. 60/959,120, filed Jul. 10, 2007.
U.S. Appl. No. 60/963,956, filed Aug. 6, 2007.
U.S. Appl. No. 61/131,644, filed Jun. 10, 2008.
U.S. Appl. No. 61/231,799, filed Aug. 6, 2009.
U.S. Appl. No. 62/163,193, filed May 18, 2015.
U.S. Appl. No. 62/189,367, filed Jul. 7, 2015.

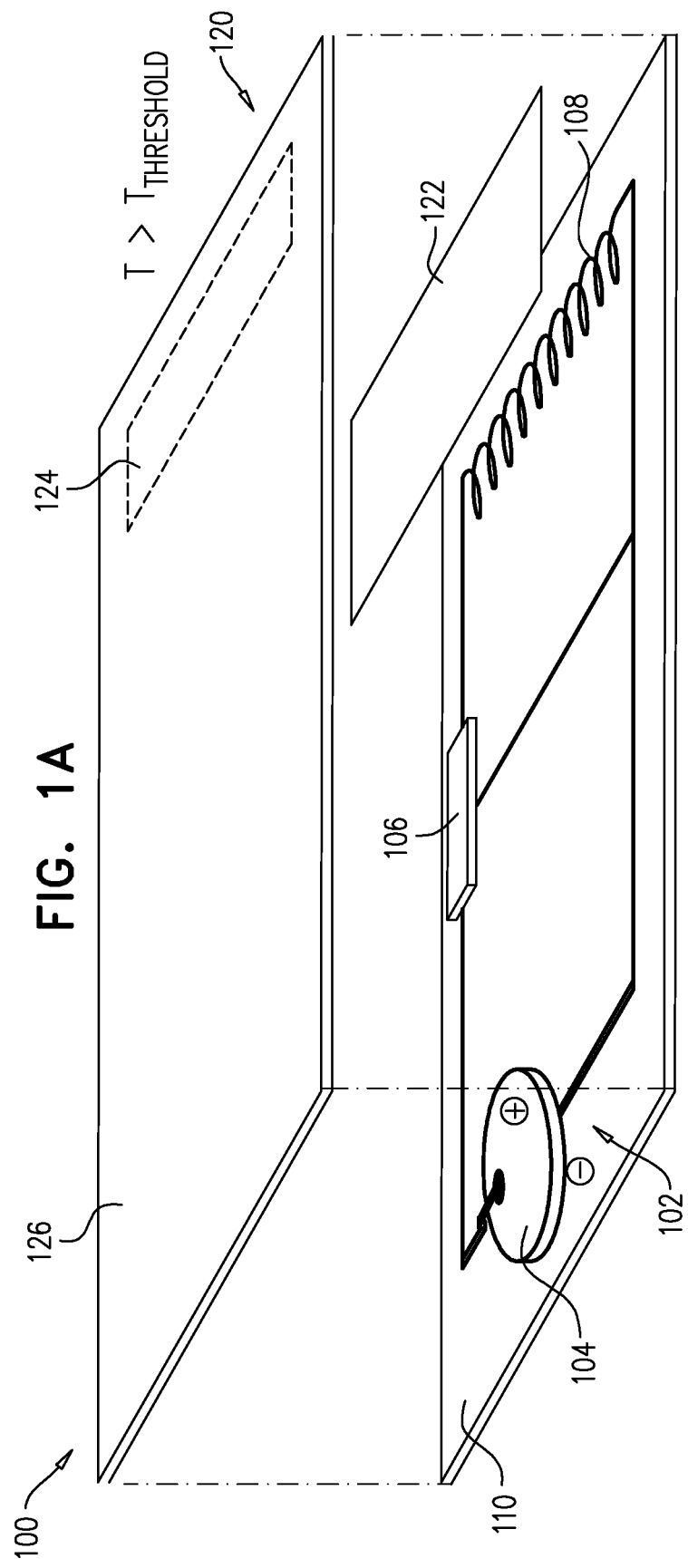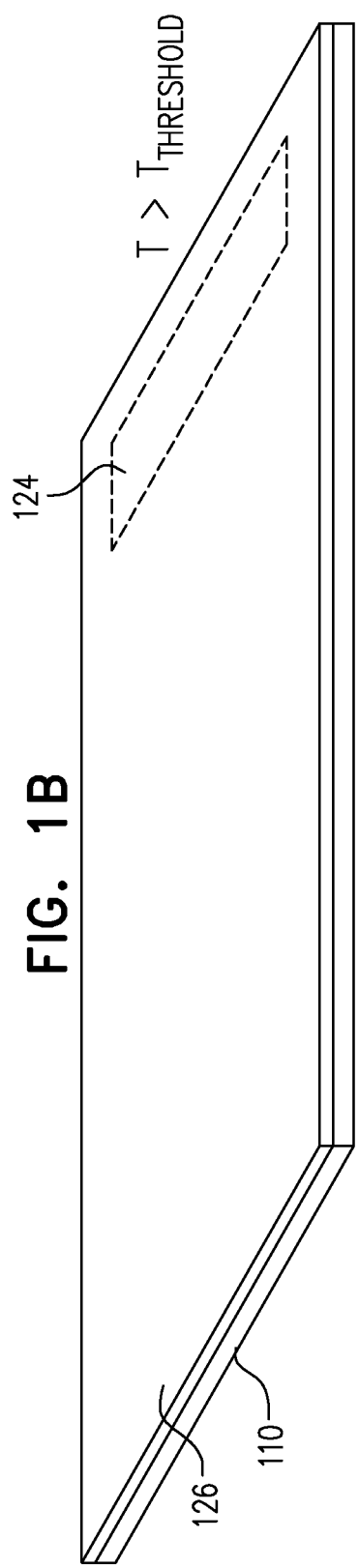

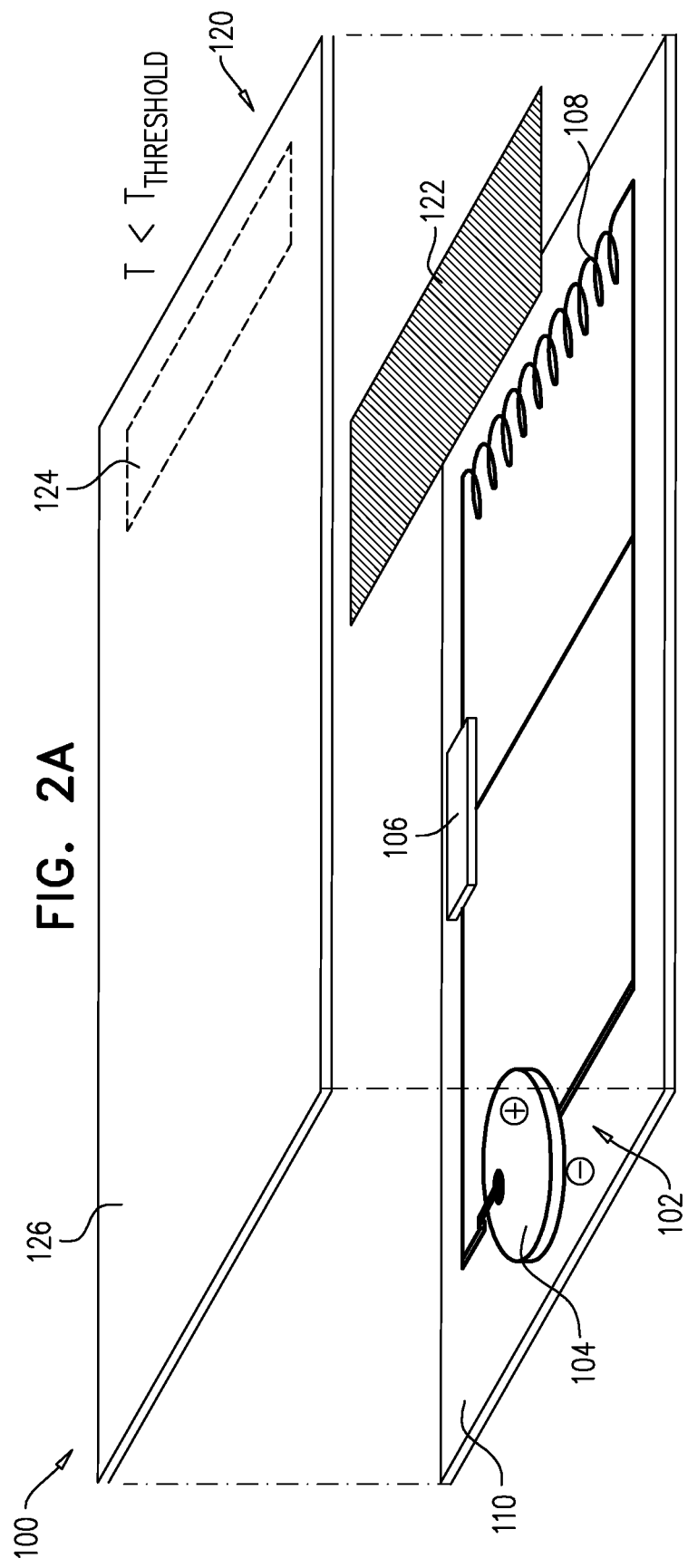
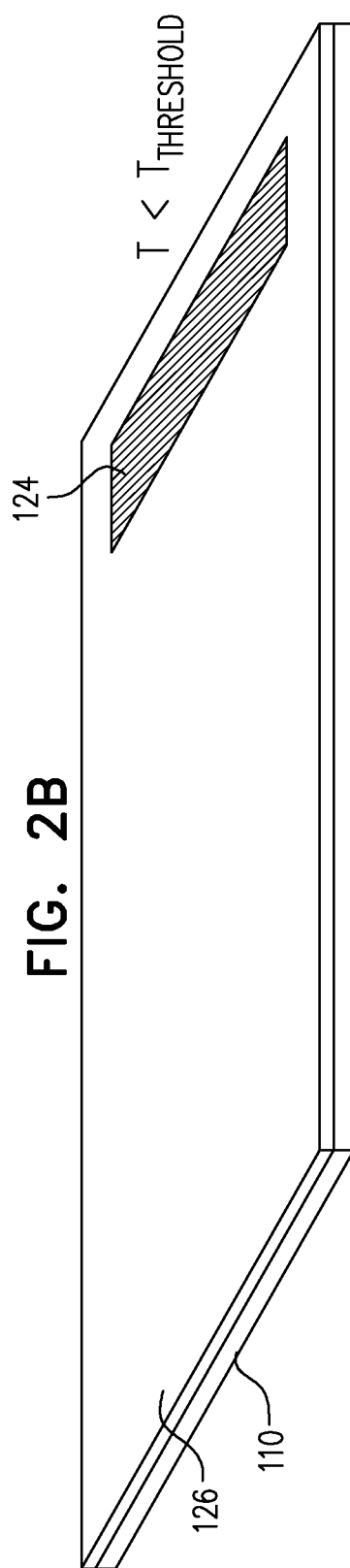

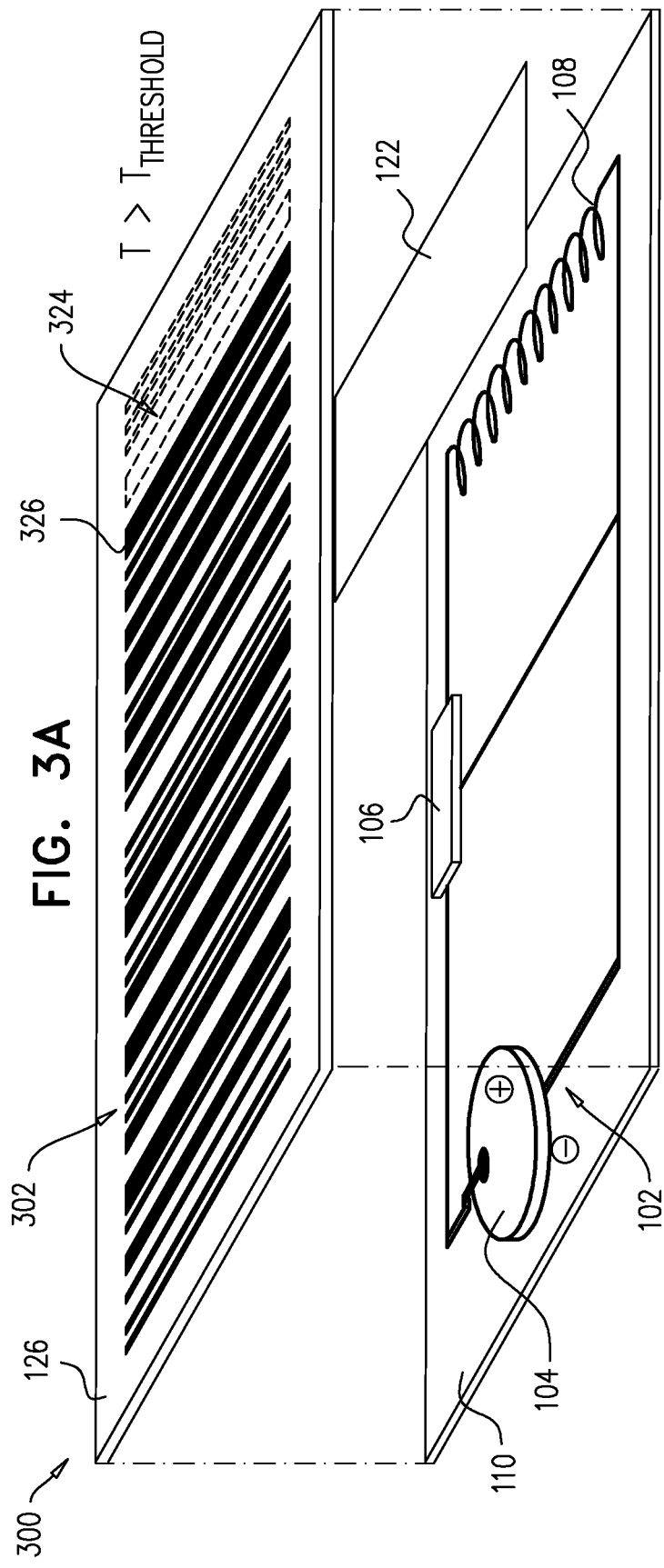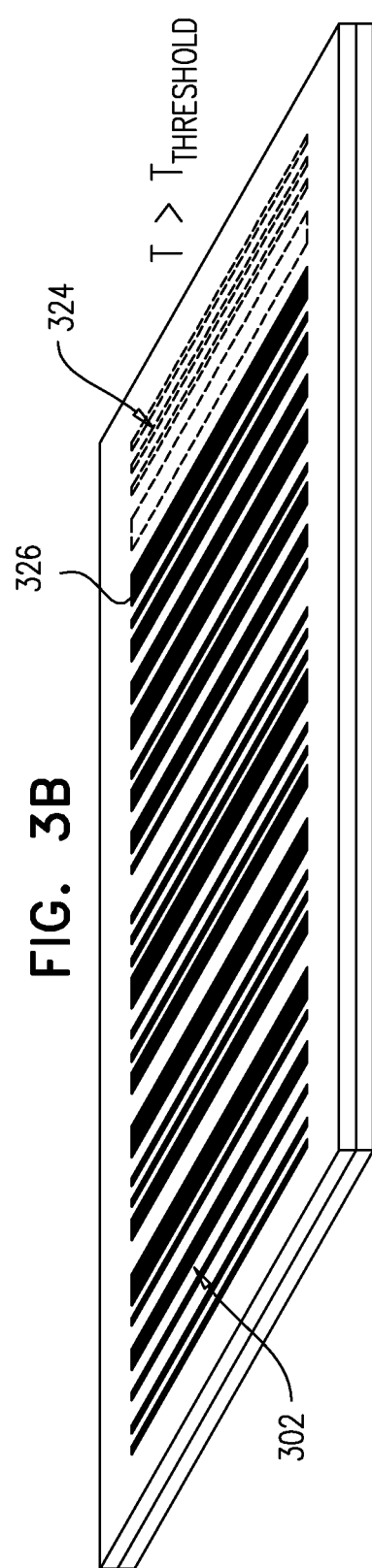

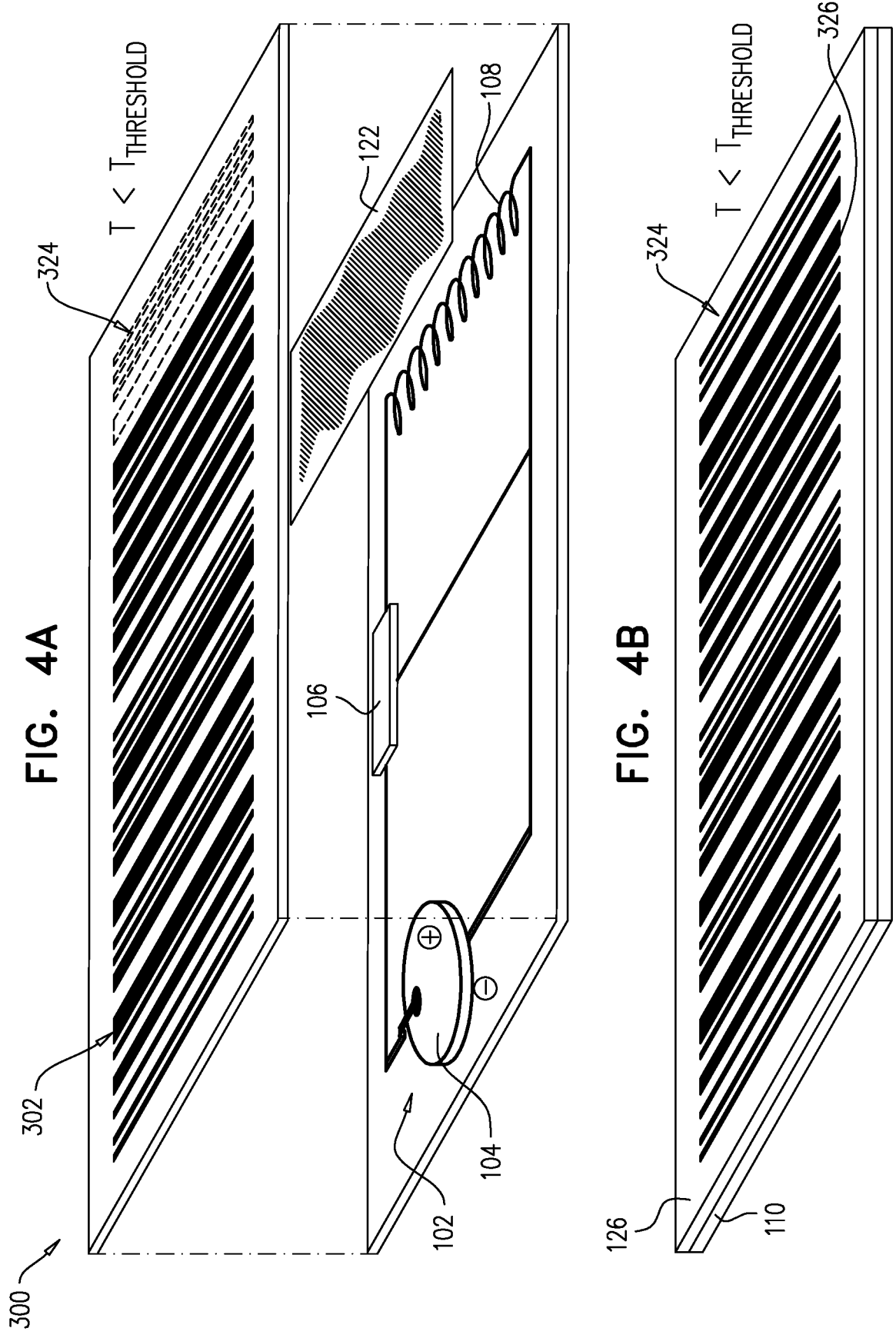

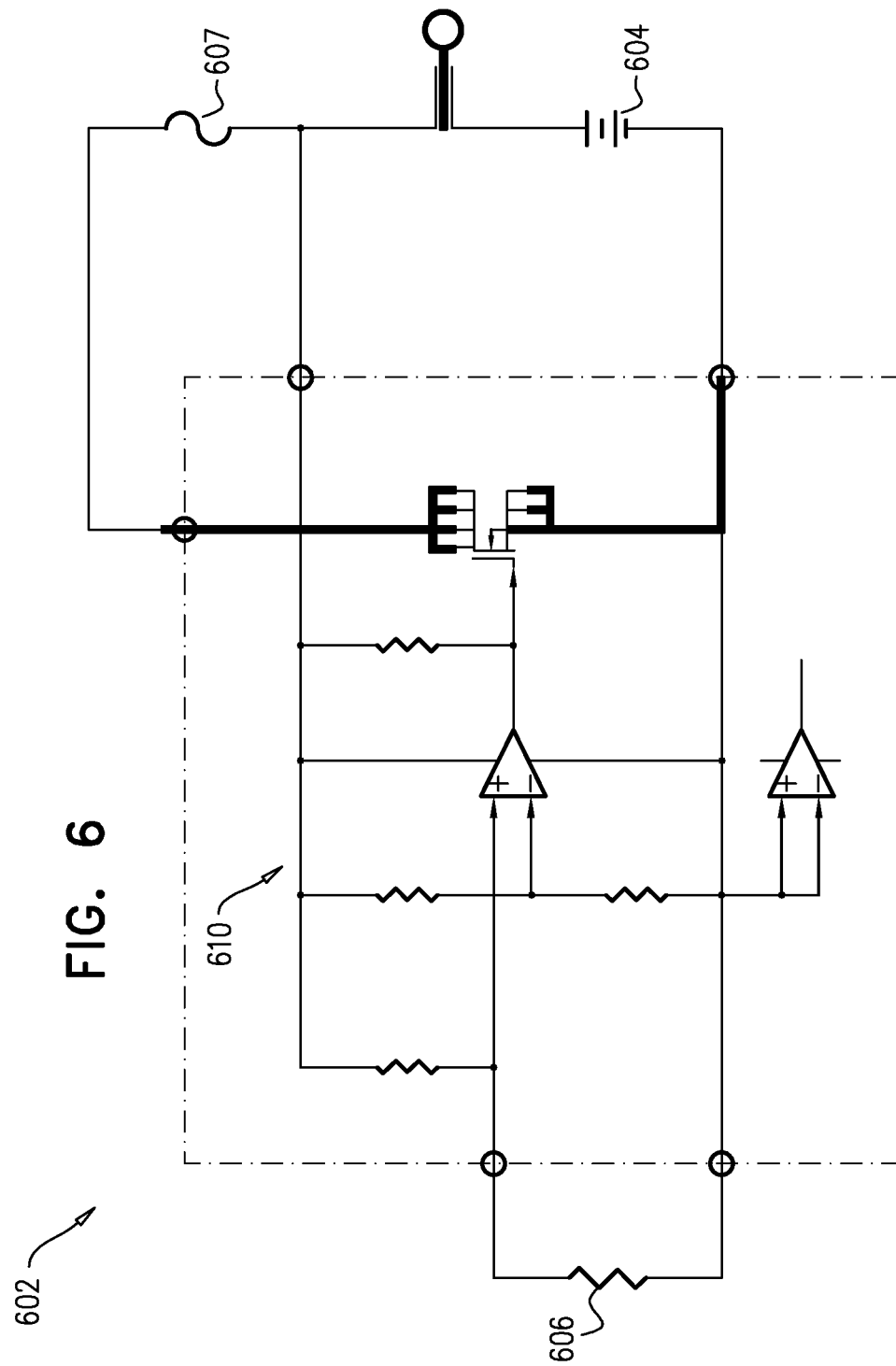

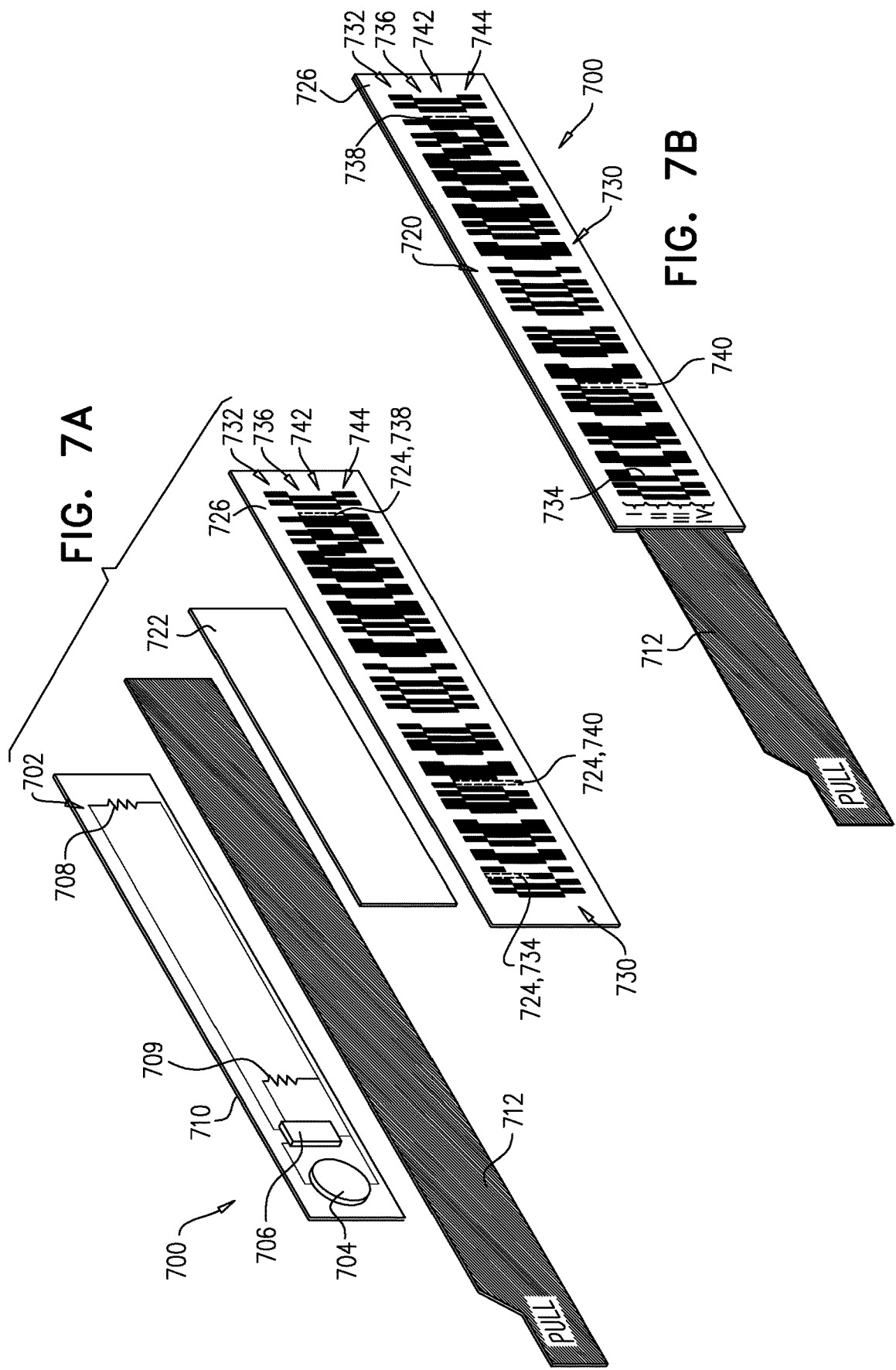

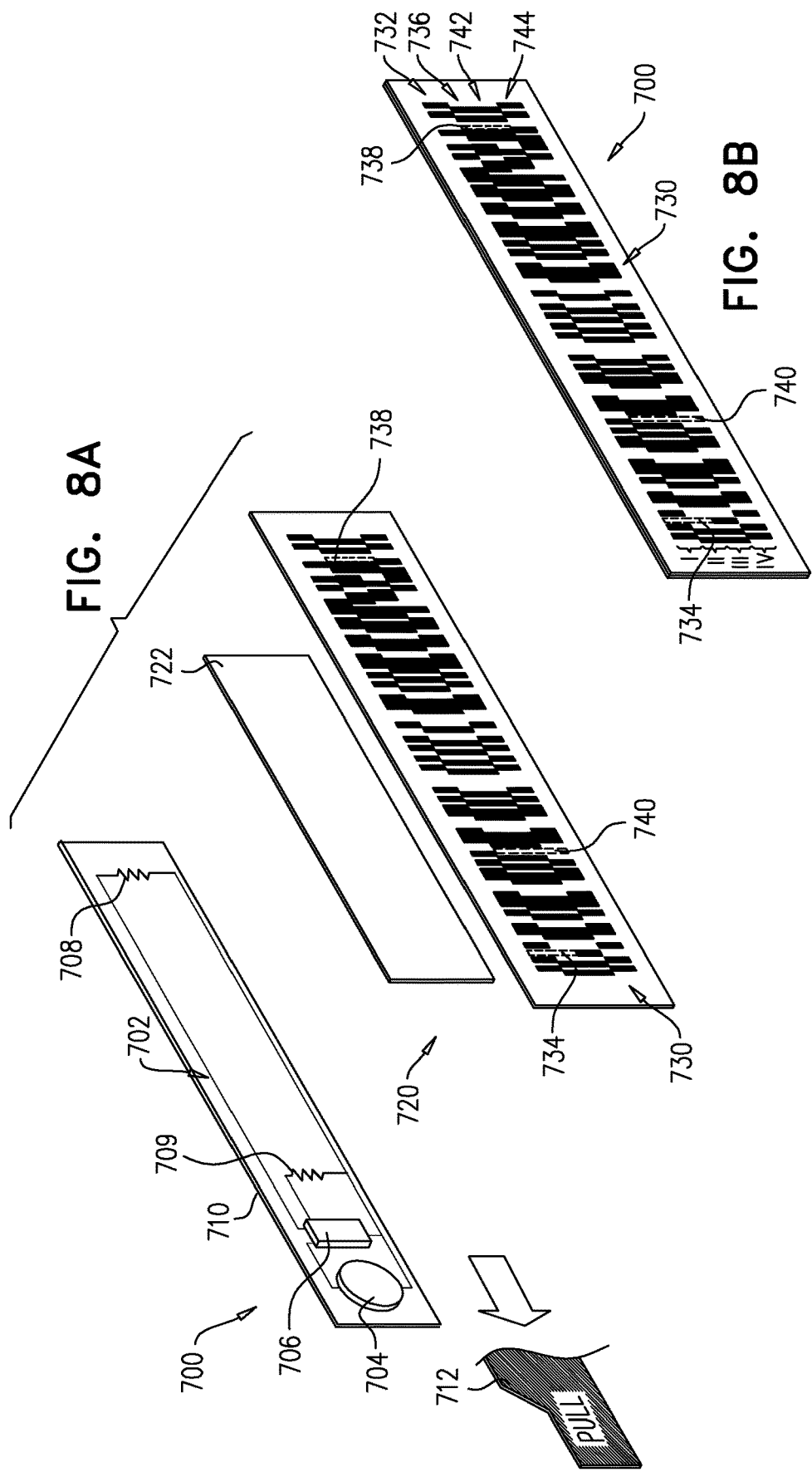

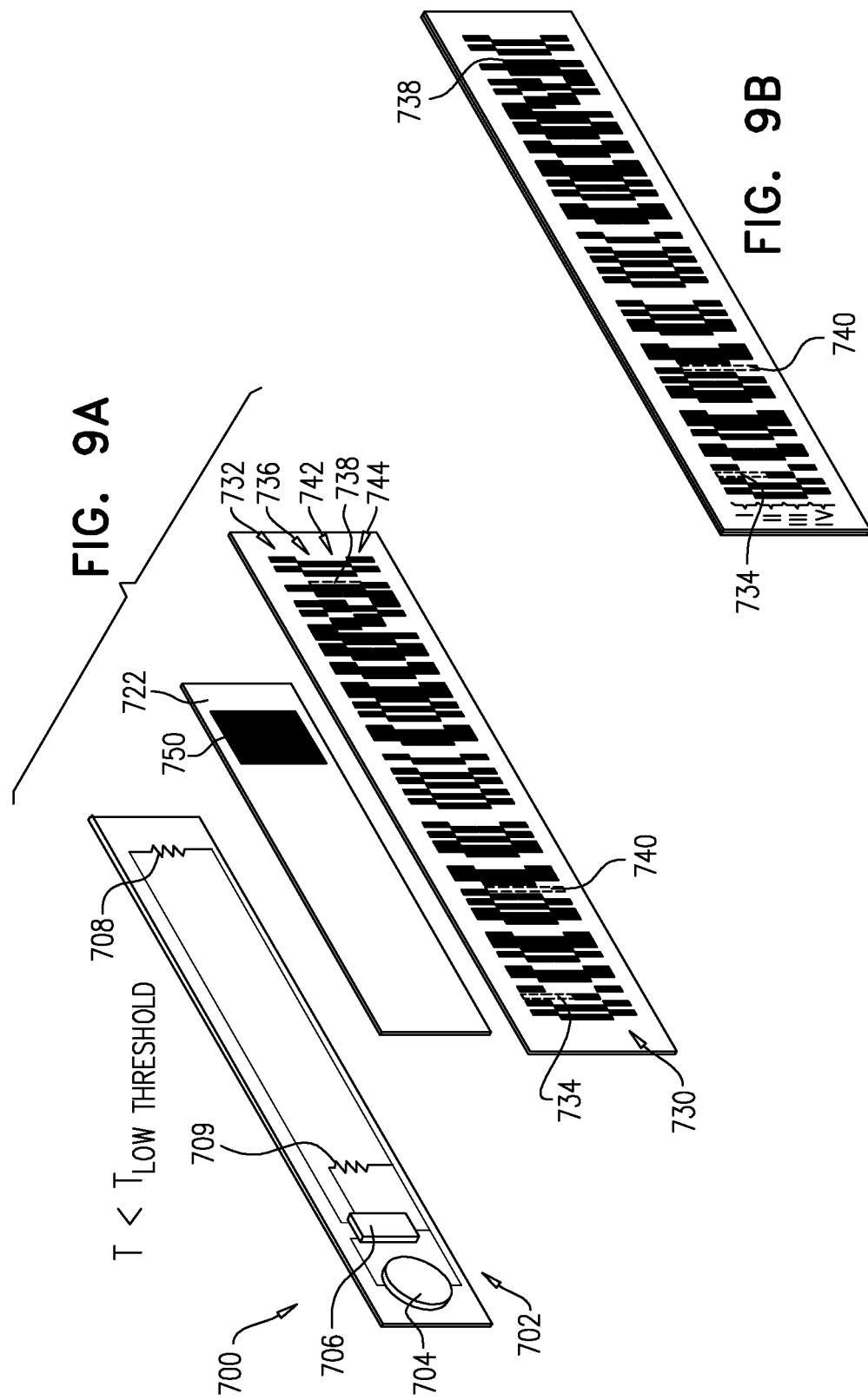

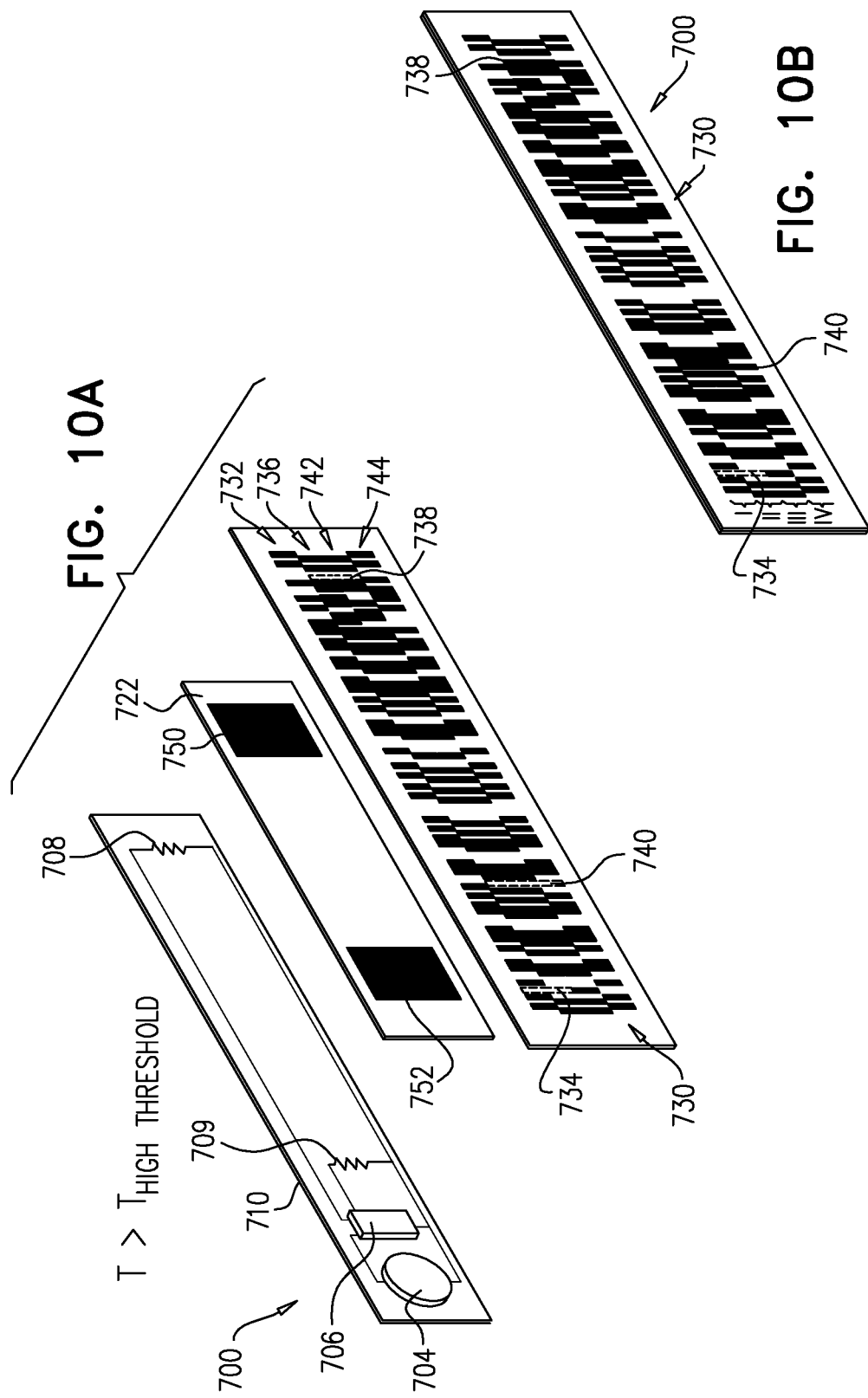

ELECTRONIC QUALITY INDICATOR

REFERENCE TO RELATED APPLICATIONS

The present application is a continuation application of U.S. patent application Ser. No. 16/895,001, filed Jun. 8, 2020, entitled "Electronic Quality Indicator", now U.S. Pat. No. 11,009,406, which is a continuation application of U.S. patent application Ser. No. 15/742,181, filed Jan. 5, 2018, entitled "Electronic Quality Indicator", now U.S. Pat. No. 10,697,837, which is a National Phase Application of International Patent Application No. PCT/IL2016/050727, filed Jul. 7, 2016, entitled "Electronic Quality Indicator", which claims priority of U.S. Provisional Patent Application Ser. No. 62/189,367 entitled LOW TEMPERATURE EXCEEDANCE QUALITY INDICATOR AND OTHER QUALITY INDICATORS, filed Jul. 7, 2015, the disclosures of which are hereby incorporated by reference.

Reference is also made to the following US Patents and Patent Applications, owned by the assignee, the disclosures of which are hereby incorporated by reference:

U.S. Pat. Nos. 7,562,811; 8,091,776; 8,807,422; 579193; 8,540,156; 8,528,808; 8,196,821; 8,950,664; 8,500; 014; 8,967,467 and U.S. Published Patent Application Nos. 2011/0006109; 2014/0353385; 2014/0252096; 2015/0053776; 2012/0145781; 2013/0334301; and 2012/0104105.

FIELD OF THE INVENTION

The present invention relates generally to quality indicators and more particularly to electronic quality indicators.

BACKGROUND OF THE INVENTION

Various types of electronic quality indicators are known in the art.

SUMMARY OF THE INVENTION

The present invention seeks to provide an electronic quality indicator for indicating exceedance of low temperature thresholds and other thresholds.

There is thus provided in accordance with a preferred embodiment of the present invention a visually sensible indicator of temperature including electronic temperature sensing circuitry sensing at least when a temperature exceeds at least one predetermined temperature threshold and providing at least one corresponding threshold exceedance output which is sensible as heat and a heat-responsive visually sensible display which is responsive to the at least one threshold exceedance output for providing at least one visually sensible indication indicating that the temperature has exceeded the predetermined temperature threshold.

Preferably, the visually sensible indication is machine readable.

Additionally or alternatively, the visually sensible indication is human readable.

Preferably, the visually sensible indication is at least a part of a bar code.

Preferably, the visually sensible indication is rendering a bar code unreadable.

In accordance with a preferred embodiment of the present invention, the exceedance of the predetermined temperature threshold is falling below a given temperature.

Additionally or alternatively, the exceedance of the predetermined temperature threshold is rising above a given temperature.

In accordance with another preferred embodiment of the present invention, the exceedance of one of the at least one predetermined temperature threshold is falling below a given temperature and exceedance of another of the at least one predetermined temperature threshold is rising above a given temperature.

In accordance with a further preferred embodiment of the present invention, the rising above a given temperature is indicated by the heat-responsive visually sensible display independent of an output of the electronic temperature sensing circuitry.

Preferably, the heat-responsive visually sensible display employs a thermochromic material.

Preferably, the electronic temperature sensing circuitry includes a mechanism operative to prevent overheating thereof.

There is further provided in accordance with another preferred embodiment of the present invention a visually sensible indicator of at least one parameter including at least one of temperature, time above or below a given temperature range, humidity and impact, the indicator including electronic sensing circuitry sensing at least when the at least one parameter exceeds a predetermined threshold and providing a threshold exceedance output which is sensible as heat and a heat-responsive visually sensible display which is responsive to the threshold exceedance output for providing a visually sensible indication indicating that the at least one parameter has exceeded the predetermined threshold.

Preferably, the visually sensible indication is machine readable.

Additionally or alternatively, the visually sensible indication is human readable.

Preferably, the visually sensible indication is at least a part of a bar code.

Preferably, the visually sensible indication is rendering a bar code unreadable.

In accordance with a preferred embodiment of the present invention, the exceedance of the predetermined threshold is falling below a given temperature.

Additionally or alternatively, the exceedance of the predetermined threshold is rising above a given temperature.

In accordance with another preferred embodiment of the present invention, the exceedance of one of the at least one predetermined threshold is falling below a given temperature and exceedance of another of the at least one predetermined threshold is rising above a given temperature.

Preferably, the rising above a given temperature is indicated by the heat-responsive visually sensible display independent of an output of the electronic at least one parameter sensing circuitry.

Preferably, the heat-responsive visually sensible display employs a thermochromic material.

Preferably, the electronic sensing circuitry includes a mechanism operative to prevent overheating thereof.

BRIEF DESCRIPTION OF THE DRAWINGS

The present invention will be understood and appreciated more fully from the following detailed description, taken in conjunction with the drawings in which:

FIGS. 1A and 1B are simplified schematic respective exploded and assembled view illustrations of a quality indicator in a first temperature state thereof, constructed and operative in accordance with a preferred embodiment of the present invention;

FIGS. 2A and 2B are simplified schematic respective exploded and assembled view illustrations of a quality indicator of a type shown in FIGS. 1A and 1B in a second temperature state thereof;

FIGS. 3A and 3B are simplified schematic respective exploded and assembled view illustrations of a quality indicator in a first temperature state thereof, constructed and operative in accordance with another preferred embodiment of the present invention;

FIGS. 4A and 4B are simplified schematic respective exploded and assembled view illustrations of a quality indicator of a type shown in FIGS. 3A and 3B in a second temperature state thereof;

FIG. 6 is a circuit diagram showing electronic components useful in a quality indicator of types shown in FIGS. 1A-4B;

FIGS. 7A and 7B are simplified respective exploded and assembled view illustrations of a quality indicator constructed and operative in accordance with a further preferred embodiment of the present invention, showing a first state thereof;

FIGS. 8A and 8B are simplified respective exploded and assembled view illustrations of a quality indicator of the type shown in FIGS. 7A and 7B, showing a second state thereof;

FIGS. 9A and 9B are simplified respective exploded and assembled view illustrations of a quality indicator of a type shown in FIGS. 7A-8B, showing a third state thereof; and FIGS. 10A and 10B are simplified respective exploded and assembled view illustrations of a quality indicator of a type shown in FIGS. 7A-9B, showing a fourth state thereof.

DETAILED DESCRIPTION OF PREFERRED EMBODIMENTS

Figure 5A:
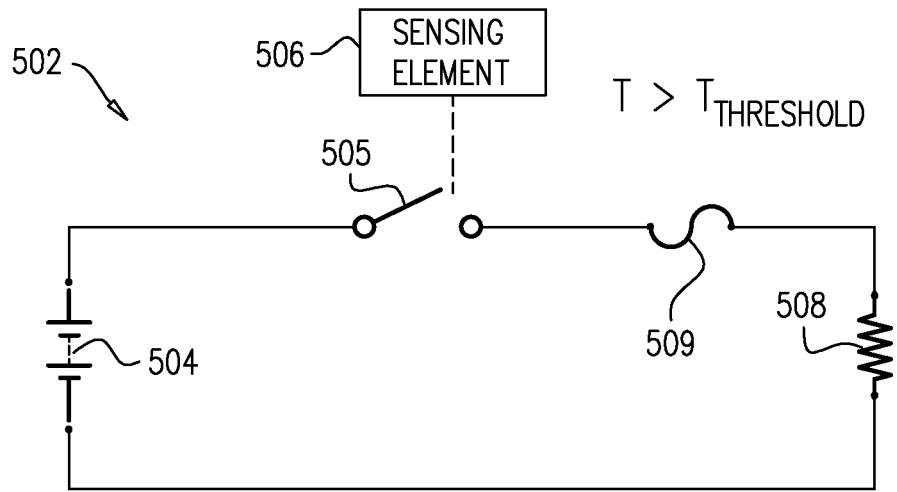
FIGS. 5A and 5B are simplified partially conceptual diagrams of electronic circuitry functionality, useful in a quality indicator of types shown in FIGS. 1A-4B.

Reference is now made to FIGS. 1A and 1B, which are simplified schematic respective exploded and assembled view illustrations of a quality indicator in a first temperature state thereof, constructed and operative in accordance with a preferred embodiment of the present invention.

As seen in FIGS. 1A and 1B, there is provided a quality indicator 100, preferably operating as a visually sensible indicator of at least one parameter, including at least one of temperature, time above or below a given temperature or temperature range, humidity and impact. Quality indicator 100 preferably includes electronic sensing circuitry 102 for sensing at least when the at least one parameter monitored by quality indicator 100 exceeds a predetermined threshold. Upon exceedance of a predetermined threshold by quality indicator 100, electronic sensing circuitry 102 preferably provides a threshold exceedance output sensible as heat. The heat output of electronic circuitry 102 preferably causes an alteration in the visual appearance of quality indicator 100, thereby providing a visual indication of quality indicator 100 having exceeded the predetermined threshold, as will be detailed henceforth.

Here, by way of example, electronic sensing circuitry 102 is shown to include a battery 104 electrically connected to at least one electronic sensing element, here embodied as a sensor 106. Sensing element 106 may be any type of electronic component or routed arrangement of components for electronically sensing exceedance of a predetermined threshold by the at least one parameter monitored by quality indicator 100. By way of example, sensor 106 may be at least one of a heat sensor, humidity sensor and/or impact sensor.

Circuitry 102 preferably includes at least one heat-generating element, here embodied as a heat-generating filament 108, which filament 108 is preferably operative to provide an output indicating exceedance of the at least one threshold, as sensed by sensor 106, which output is sensible as heat. Battery 104, sensor 106 and filament 108 comprising circuitry 102 may be located on a supporting surface of quality indicator 100, such as a printed circuitry board (PCB) layer 110. It is appreciated that circuitry 102 is shown in a highly simplified form in FIGS. 1A and 1B and may include additional and/or alternative electronic components. Further details concerning possible configurations of circuitry 102 will be provided henceforth with reference to FIGS. 5A-6.

Quality indicator 100 further preferably includes a heat-responsive visually sensible display 120, responsive to the threshold exceedance output of filament 108 of circuitry 102. Heat-responsive visually sensible display 120 preferably employs a thermochromic material 122, such as a thermal paper 122, located in close proximity to filament 108, such that an appearance of thermal paper 122 is modified upon filament 108 becoming hot, following exceedance of the threshold as sensed by sensor circuitry 102. The change in appearance of thermal paper 122 thus provides a visually sensible indication of exceedance of a predetermined threshold by the at least one monitored parameter.

Here, by way of example, the change in appearance of thermochromic material 122 may be viewed by a user of quality indicator 100 through a transparent window 124 formed in an exterior upper surface 126 of quality indicator 100. An appearance of transparent window 124 may thus be interpreted by a user of quality indicator 100 as indicative of whether quality indicator 100 has exceeded a predetermined threshold. Alternatively, thermal paper 122 may itself form an upper surface of quality indicator 100, such that the change in appearance of thermal paper 122 may be directly viewable by a user. In this case, additional upper surface 126 including transparent window 124 may be obviated.

The modification of thermal paper 122 upon heating thereof is preferably irreversible, such that window 124 continues to appear colored following exceedance of a predetermined threshold as sensed and indicated by circuitry 102, independent of the present conditions to which quality indicator is subject. As a result, quality indicator 100 provides a visually sensible indication of possible exposure to unacceptable conditions in the history of quality indicator 100, irrespective of the present state of the quality indicator.

The operation of quality indicator 100 will now be exemplified and further detailed with reference to FIGS. 1A-2B, with reference to which quality indicator 100 is described as operating as a visually sensible indicator of temperature. However, it is appreciated that the following description also applies to the operation of quality indicator 100 as a visually sensible indicator of parameters other than temperature, such as time or cumulative time above or below a given temperature or temperature range, humidity and/or impact, with appropriate modifications as will be readily apparent to those skilled in the art.

Referring now to FIGS. 1A and 1B, quality indicator 100 is seen to be in a first temperature state, at a temperature T above a threshold temperature $T_{threshold}$. In this embodiment of quality indicator 100, quality indicator 100 is preferably operative as a low-temperature indicator, for indicating exceedance of a low-temperature threshold either by the environment within which quality indicator 100 is located or by a temperature-sensitive item to which quality indicator 100 may be affixed. Such items may include, by way of example, chemical or biological materials, food products and vaccines.

It is appreciated that quality indicator 100 may alternatively operate as a high-temperature indicator for indicating exceedance of a high-temperature threshold, or as a 'time and temperature' indicator, for indicating exceedance of a high or low temperature threshold or temperature range for a cumulative predetermined threshold period of time.

Electronic sensing circuitry 102 is here preferably operative as electronic temperature sensing circuitry, for sensing when the temperature of quality indicator 100 exceeds a predetermined temperature threshold, and more particularly when the temperature of quality indicator 100 falls below a predetermined temperature. For this purpose, sensor 106 operates a temperature sensor which may be set to any desired low temperature threshold such as, by way of example, 2° C. Sensor 106 is preferably operative to prevent current flow through filament 108 at temperatures above $T_{threshold}$ and to allow current flow through filament 108 at temperatures less than or equal to $T_{threshold}$. Sensor 106 may be embodied, by way of example, as a positive temperature coefficient (PTC) thermistor, the resistance of which changes with falling temperature, examples of which are well known in the art.

In the first temperature state of quality indicator 100 illustrated in FIGS. 1A and 1B, wherein quality indicator 100 is at a temperature $T>T_{threshold}$, current flow through electronic temperature sensor circuitry 102 is prevented, such that filament 108 is not heated. Thermal paper 122, located abutting filament 108 and viewable through window 124, is therefore not heated by filament 108 and thus retains its original appearance. By way of example, thermal paper 122 may be white when in an un-heated state. Window 124, backed by thermal paper 122, thus appears to be white or blank when quality indicator 100 is at a temperature above the low-temperature threshold, as seen most clearly in FIG. 1B. Window 124 in combination with thermal paper 122 thus provides a human-readable visually sensible indication of quality indicator 100 being at a temperature above the low-temperature threshold.

Upon quality indicator 100 falling to a temperature below $T_{threshold}$, as seen in FIGS. 2A and 2B, the exceedance of the low temperature threshold is preferably sensed by electronic sensor circuit 102, which electronic sensor circuit 102 responsively allows current to flow to filament 108. By way of example, the resistance of sensor 106 may decrease upon temperature T falling below $T_{threshold}$, such that current is allowed to flow to filament 108, thereby heating filament 108. It is a particular feature of a preferred embodiment of the present invention that the falling of indicator 100 to below a threshold temperature thereof is output in the form of heat, in this case, by way of the heating of filament 108.

It is appreciated that sensor 106 is preferably of a type to substantially entirely prevent current flowing through circuitry 102 at temperatures above $T_{threshold}$ and to permit current to flow through circuitry 102 at temperatures below $T_{threshold}$ in a discrete manner. Alternatively, sensor 106 may allow minimal current to flow through circuitry 102 at temperatures above $T_{threshold}$, which minimal current is not sufficient to significantly heat filament 108, and to allow increased current to flow through circuitry 102 at temperatures below $T_{threshold}$, which increased current is sufficient to significantly heat filament 108.

Upon filament 108 becoming heated, filament 108 in turn heats thermal paper 122, which thermal paper 122 preferably undergoes a change in visual appearance thereupon. Thermal paper 122 may be in direct contact with filament 108 or may be located in sufficiently close proximity to filament 108 so as to be heated thereby. By way of example, as seen most clearly in FIG. 2A, thermal paper 122 may darken upon being heated by filament 108. More particularly, thermal paper 122 may change from white to black upon being heated, although it is appreciated alternative color changes in thermal paper 122 may also be possible.

As best appreciated from consideration of FIG. 2B, window 124, backed by darkened thermal paper 122, thus changes in appearance from blank, as seen in FIG. 1B, to dark or opaque when quality indicator 100 falls to a temperature below the low-temperature threshold. Window 124 in combination with thermal paper 122 thus provides a human-readable visually sensible indication of quality indicator 100 having fallen to a temperature below the low-temperature threshold when quality indicator 100 is in the temperature state shown in FIGS. 2A and 2B, due to the change in visual appearance thereof.

It is appreciated that the human-readable visually sensible indication of quality indicator 100 having fallen below $T_{threshold}$ presented in FIGS. 1A-2B in a highly simplified form, as a single colorable window 124. It will be apparent to those skilled in the art that the human-readable visually sensible indication may alternatively be embodied in more complex forms, including multiple transparent windows which may change appearance so as to bear a human-readable text message or symbol upon the thermochromic material therebeneath changing color due to heating.

Thus, by way of example, colorable window 124 may be configured as multiple transparent windows in the form of text such as 'TOO COLD'. In the case that upper surface 126 is white, the text will not be visible when quality indicator 100 is at a temperature above the low-temperature threshold, due to the transparent windows being backed by a white surface formed by thermal paper 122 and thus not being visually detectable by a user of quality indicator 100. Upon quality indicator 100 falling to a temperature below the low-temperature threshold and thermal paper 122 being heated by filament 108, thermal paper 122 will change from white to black, thereby forming a black backing for the transparent windows in white surface 126. Consequently, the textual message 'TOO COLD' borne by white surface 126 will become visible and interpretable by a user.

It is further appreciated that the visually sensible indication of quality indicator 100 having fallen to a temperature below $T_{threshold}$ is not limited to being a human-readable visually sensible indication and may additionally or alternatively be a machine-readable indication, as seen in the case of a quality indicator 300 illustrated in FIGS. 3A-4B.

Quality indicator 300 may generally resemble quality indicator 100 in all relevant aspects thereof, with the exception of the configuration of upper surface 126. Whereas upper surface 126 of quality indicator 100 is illustrated as a generally blank surface, including a single transparent window 124, upper surface 126 of quality indicator 300 is preferably embodied as a barcoded surface, including a machine-readable barcode 302 comprising at least one transparent window, here embodied as a plurality of transparent windows 324. It is appreciated that barcode 302 is not limited to being formed on upper surface 126 and may alternatively be located on other exterior surfaces of quality indicator 300, in accordance with the design requirements thereof.

When quality indicator 300 is at a temperature $T > T_{threshold}$, as shown in FIGS. 3A and 3B, current flow to filament 108 is prevented by electronic sensor circuitry 102, such that filament 108 is not heated. Thermal paper 122, located abutting filament 108, is therefore not heated by filament 108 when quality indicator 300 is in this state and thus retains its original appearance. By way of example, thermal paper 122 may be white when in an un-heated state. Windows 324, backed by thermal paper 122, thus appear to be white or blank when quality indicator 300 is at a temperature above the low-temperature threshold, as seen most clearly in FIG. 3B.

In this state, barcode 302 appears to terminate at a final indicium 326 and windows 324 do not form a part of barcode 302. Barcode 302 is preferably machine-readable by a standard barcode scanner in this state, thereby providing a machine-readable visually sensible indication of quality indicator 300 being at a temperature above the low-temperature threshold. Alternatively, barcode 302 may be unreadable in this state.

Upon quality indicator 300 falling to a temperature below $T_{threshold}$, as illustrated in FIGS. 4A and 4B, the exceedance of the low temperature threshold is preferably sensed by electronic sensor circuitry 102, which circuitry 102 responsively allows current to flow to filament 108. By way of example, the resistance of electric sensor circuitry 102 may change upon temperature T falling below $T_{threshold}$, such that current is allowed to flow to filament 108, thereby heating filament 108. It is a particular feature of a preferred embodiment of the present invention that the falling of indicator 300 to below a threshold temperature thereof is output in the form of heat, in this case, by way of the heating of filament 108.

Heated filament 108 in turn preferably heats thermal paper 122, which thermal paper 122 preferably undergoes a change in visual appearance thereupon. By way of example, as seen most clearly in FIG. 4A, thermal paper 122 may darken upon being heated by filament 108. More particularly, thermal paper 122 may change from white to black upon being heated. Thermal paper 122 may become substantially entirely black, as illustrated in FIG. 4A. Alternatively, thermal paper 122 may undergo a localized change in visual appearance such as blackening only in a region immediately proximal to filament 108.

As best appreciated from consideration of FIG. 4B, windows 324, backed by darkened thermal paper 122, appear to be black when quality indicator 300 is at a temperature below the low-temperature threshold, the blackened regions visible through windows 324 forming a part of barcode 302, beyond indicium 326. As a result of additional regions being appended to barcode 302, barcode 302 preferably changes from the first state thereof illustrated in FIG. 3B to a second state thereof, illustrated in FIG. 4B. The change in state of barcode 302 may be from a first readable state of FIG. 3B to a second readable state of FIG. 4B, from a first readable state of FIG. 3B to an unreadable state of FIG. 4B or from an unreadable state of FIG. 3B to a readable state of FIG. 4B. The reading of barcode 302 by a conventional barcode scanner thus may provide an indication of possible exceedance of a low-temperature threshold by quality indicator 300.

It is appreciated that barcode 302 may be any type of standard machine-readable barcode, as are well known in the art, such that the reading of barcode 302 by a barcode scanner may be used to indicate possible exposure of quality indicator 300 or an item with which quality indicator 300 is associated to a temperature below the low-temperature threshold.

It will be understood that windows 324 are not limited to being located at a terminus of barcode 302 and may alternatively be positioned at other locations within barcode 302, such as at the start or in middle of barcode 302. It will be further understood that windows 324 are not limited to the particular configuration illustrated herein and may be formed as a variety of shapes and numbers of transparent windows, adapted to form part of a readable barcode or to render a barcode unreadable upon being colored.

Furthermore, it will be understood that upper surface 126 in combination with windows 324 may be configured such that prior to exceedance of a predetermined threshold by indicator 300, upper surface 126 including windows 324 is entirely blank and does not display a barcode. Upon exceedance of the threshold and consequent heating and darkening of thermal paper 122, a readable barcode may become visible as a result of the coloring of windows 324.

Figure 5B:
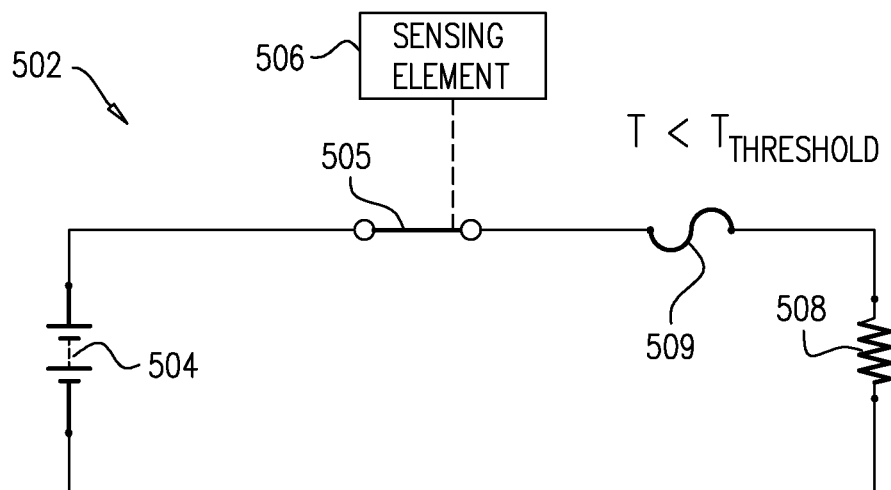

Reference is now made to FIGS. 5A and 5B, which are simplified partially conceptual diagrams illustrating the functioning of electronic circuitry useful in a quality indicator of types shown in FIGS. 1A-4B.

As seen in FIGS. 5A and 5B, there is provided a partially conceptual diagram illustrating the functioning of electronic sensing circuitry 502, operative in a quality indicator of the present invention such as quality indicator 100 or 300. It is appreciated that electronic sensing circuitry 502 is representative of the functioning of highly simplified electronic sensing circuitry 102 presented in FIGS. 1A-4B.

Electronic sensing circuitry 502 preferably includes a power supply such as a battery 504 and preferably exhibits electronic switching functionality, here conceptually represented in the form of an electronic switch 505. It is appreciated that electronic switch 505 does not necessarily correspond to a physical switch present in circuitry 502, but rather represents switching functionality performed by circuitry 502.

Electronic sensing circuitry 502 further preferably includes an electronic sensing element 506 for controlling the switching functionality represented by switch 505 and a heat-generating element, here shown in the form of a heat-generating filament 508. Circuitry 502 also may include a mechanism for preventing the overheating thereof, here shown in the form of a fuse 509.

The operation of circuitry 502 will be exemplified henceforth with reference to FIGS. 5A and 5B in the context of sensor 506 being a low-temperature sensor and circuitry 502 hence operating as electronic temperature sensing circuitry within a low-temperature exceedance quality indicator, such as quality indicator 100 or 300. It is appreciated, however, that sensor 506 may be any type of electronic sensor component or components for sensing exceedance of a predetermined threshold by a particular parameter to be monitored by a quality indicator of the present invention, which parameter may be at least one of temperature, humidity, time above or below a given temperature or temperature range, impact or other parameters.

Turning now to FIG. 5A, circuitry 502 is seen to be at a temperature $T > T_{threshold}$, where $T_{threshold}$ a low-temperature threshold of a quality indicator with which is circuitry 502 is preferably associated. The state of circuitry 502 as represented in FIG. 5A thus corresponds to the state of quality indicator 100 in FIGS. 1A and 1B and to the state of quality indicator 300 in FIGS. 3A and 3B. The temperature of circuitry 502 is preferably sensed by low-temperature sensor 506. In this state, circuitry 502 prevents current flow to filament 508, thus operating as an open circuit, as represented by the open state of conceptual switch 505.

Upon the temperature falling to below $T_{threshold}$, as shown in FIG. 5B, circuitry 502 allows current to flow to filament 508, thus operating as a closed circuit, as represented by the closed state of conceptual switch 505. This corresponds to the state of quality indicator 100 in FIGS. 2A and 2B and the state of quality indicator 300 in FIGS. 4A and 4B. Filament 508 heats up due to the flow of current therethrough, thereby providing a low-temperature threshold exceedance output in the form of heat. Overheating of filament 508 is preferably prevented by the presence of fuse 509. Fuse 509 is preferably configured to melt or otherwise form an open-circuit at a predetermined current level and/or time, sufficient to allow a change in visual appearance of the thermochromic material to occur prior thereto.

Reference is now made to FIG. 6, which is a circuit diagram showing electronic components useful in a quality indicator of types shown in FIGS. 1A-4B. It is appreciated that in contrast to FIGS. 5A and 5B, which drawings are partially conceptual diagrams primarily illustrating functionality of electronic circuitry 502, FIG. 6 illustrates a physical arrangement of electronic components found to be useful in a quality indicator of the present invention.

As seen in FIG. 6, electronic sensing circuitry 602 may include a battery 604, a temperature sensor 606 and a fuse 607. In this embodiment, fuse 607 preferably acts both as a heat-generating element and as a heat-regulating element for preventing overheating, such that the need for two separate elements respectively individually carrying out these functions is obviated.

Upon exceedance of a predetermined threshold temperature being sensed by temperature sensor 606, an electrical property of temperature sensor 606, such as resistance, may change, thereby allowing current to flow through circuitry 602. Fuse 607 is consequently heated and may subsequently melt or otherwise form an open circuit at a given current level. It is appreciated that circuitry 602 may also include other electrical components, generally designated by the reference number 610, to ensure optimum functioning thereof.

Reference is now made to FIGS. 7A and 7B, which are simplified respective exploded and assembled view illustrations of a quality indicator constructed and operative in accordance with a further preferred embodiment of the present invention, showing a first state thereof.

As seen in FIGS. 7A and 7B, there is provided a quality indicator 700, preferably operating as a visually sensible indicator of at least one parameter, which at least one parameter preferably includes at least one of temperature, time above or below a given temperature or temperature range, humidity and impact. Quality indicator 700 preferably includes electronic sensing circuitry 702 for sensing at least when the at least one parameter monitored by quality indicator 700 exceeds a predetermined threshold. Upon exceedance of a predetermined threshold by quality indicator 700, electronic sensing circuitry 702 preferably provides a threshold exceedance output sensible as heat. The heat output of electronic circuitry 702 preferably causes an alteration in the visual appearance of quality indicator 700, thereby providing a visual indication of quality indicator 700 having exceeded the predetermined threshold, as will be detailed henceforth.

Here, by way of example, electronic sensing circuitry 702 is shown to include a battery 704 electrically connected to at least one electronic sensing element, here embodied as an electronic sensor 706. Sensor 706 may be any type of electronic component or routed arrangement of electronic components for electronically sensing exceedance of a predetermined threshold by the at least one parameter monitored by quality indicator 700. By way of example, sensor 706 may be at least one of a heat sensor, time and temperature sensor, humidity sensor and impact sensor.

Sensing circuitry 702 further preferably includes a first heat-generating filament 708 and a second heat-generating filament 709, which filaments 708, 709 are preferably respectively operative to provide outputs indicating exceedance of respective thresholds, as sensed by sensor circuitry 702, which outputs are sensible as heat. Battery 704, sensor 706 and filaments 708, 709 comprising circuitry 702 may be located on a supporting surface of quality indicator 700, such as a PCB layer 710. It is appreciated that circuitry 702 is shown in a highly simplified form in FIGS. 7A and 7B and may include additional and/or alternative electronic components, as exemplified earlier with reference to FIGS. 5A-6.

It is a particular feature of this embodiment of the present invention that electronic sensing circuitry 702 is disabled and hence sensor 706 irresponsive to changes in the parameter sensed thereby, prior to the activation of quality label 700. Circuitry 702 may be activated by way of an actuator element, here embodied as an actuation pull strip 712. Actuation pull strip 712 may be embodied as a displaceable pull strip for actuating circuitry 702 upon removal thereof. By way of example, actuation pull strip 712 may be connected to battery 704, such that battery 704 is activated upon removal of pull strip 712.

Quality indicator 700 further preferably includes a heat-responsive visually sensible display 720, responsive to the threshold exceedance outputs of filaments 708 and 709 of circuitry 702. Heat-responsive visually sensible display 720 preferably employs a thermochromic material 722, such as a thermal paper 722 preferably located with respect to filaments 708 and 709 such that an appearance of thermal paper 722 is modified upon filament 708 and/or 709 becoming hot, following exceedance of the threshold. The change in appearance of thermal paper 722 thus provides a visually sensible indication of exceedance of a predetermined threshold by the at least one monitored parameter.

Here, by way of example, the change in appearance of thermochromic material 722 is preferably visible by way of a plurality of transparent windows 724 preferably formed in an exterior upper surface 726 of quality indicator 700. An appearance of transparent windows 724 is thereby preferably readably indicative of whether quality indicator 700 has exceeded a predetermined threshold, as will be detailed henceforth.

Quality indicator 700 is preferably generally of type described, inter alia, in U.S. Pat. No. 8,091,776 of the applicant, which is incorporated herein by reference. Thus, heat-responsive visually sensible display 720 further preferably includes a multiplicity of barcodes 730 preferably formed on surface 726 such that plurality of transparent windows 724 are incorporated within multiplicity of barcodes 730.

Here, by way of example, plurality of barcodes 730 is shown to include a first barcode 732 lying in a first tier I and incorporating a first portion of a first transparent window 734; a second barcode 736 lying in a second tier II and including a second portion of the first transparent window 734, a first portion of a second transparent window 738 and a first portion of third transparent window 740; a third barcode 742 lying in a third tier III and incorporating a second portion of second transparent window 738 and a second portion of third transparent window 740; and a fourth barcode 744 lying in a fourth tier TV and incorporating a third and final portion of third transparent window 740, It is appreciated that first—third transparent windows 734, 738 and 740 are particularly preferred embodiments of plurality of transparent windows 724.

In the illustrated embodiment of quality indicator 700, there are preferably four operational states, namely a first operational state prior to activation of circuitry 702 in which first state a first one of multiplicity of barcodes 730 is machine-readable and the remaining ones of multiplicity of barcodes 730 are unreadable; a second operational state following activation of circuitry 702 and prior to exceedance of a first threshold by quality indicator 700, in which second state a second one of multiplicity of barcodes 730 is machine-readable and the remaining ones of multiplicity of barcodes 730 are unreadable; a third operational state following activation of circuitry 702 and upon exceedance of a first threshold by quality indicator 700, in which third state a third one of multiplicity of barcodes 730 is machine-readable and the remaining ones of multiplicity of barcodes 730 are unreadable and a fourth operational stale following activation of circuitry 702 and upon exceedance of a second threshold, in which fourth state a fourth one of multiplicity of barcodes 730 is machine-readable and the remaining ones of multiplicity of barcodes 730 are unreadable.

The operation of quality indicator 700 and particularly the transition between the operational states thereof responsive to sensing of parameters monitored thereby will now be exemplified and further detailed with reference to FIGS. 7A-10B, with reference to which drawings quality indicator 700 is described as preferably operating as a visually sensible indicator of temperature and of temperature for a given time. However, it is appreciated that the following description also applies to the operation of quality indicator 700 as a visually sensible indicator of parameters other than temperature and time above or below a given temperature or temperature range, such as humidity and/or impact, with appropriate modifications as will be readily apparent to those skilled in the art.

In the first operational state of quality indicator 700 illustrated in FIGS. 7A and 7B, activation pull strip 712 has not been removed from quality indicator 700 and circuitry 702 is therefore inactive and irresponsive to changes in temperature. Thermal paper 722 is preferably located interfacing multiplicity of barcodes 730 and activation pull strip 712. Thermal paper 722 preferably extends along some but not all of an anterior portion of surface 726 such that first transparent window 734 is backed by activation pull strip 712 and second and third transparent windows 738 and 740 are backed by thermal paper 722 when quality indicator 700 is in an assembled state, as shown in FIG. 7B. Activation pull strip 712 is preferably black, such that transparent window 734 is backed by a black surface formed by activation pull strip 712. As seen most clearly in FIG. 7B, transparent window 734 thus appears to be black, thereby rendering first barcoded region 732 of which blackened transparent window 734 forms a part, to be in a machine-readable state.

Thermal paper 722 is preferably white, such that transparent windows 738 and 740 are backed by a white surface formed by thermal paper 722. As seen most clearly in FIG. 7B, transparent windows 738 and 740 thus appear to be white, thereby rendering second, third and fourth barcoded regions 736, 742 and 744 of which whitened transparent windows 738, 740 form a part to be unreadable.

It is understood that in the first operational state of quality indicator 700 a single barcode, namely barcode 732, is machine readable whereas all of the remaining barcodes of multiplicity of barcodes 730 are unreadable. The scanning of multiplicity of barcodes 730 by a conventional barcode scanner therefore may be used to confirm that quality indicator 700 has not yet been activated. It will be appreciated that this would be the case irrespective of the temperature of quality indicator 700, since in this first operational state circuitry 702 has not yet been switched on and is thus insensitive to changes in temperature.

Turning now to FIGS. 8A and 8B, illustrating the second operational state of quality indicator 700, activation pull strip 712 is removed, thereby activating circuitry 702 and hence quality indicator 700. In this embodiment of quality indicator 700, electronic sensing circuitry 702 is preferably operative as electronic temperature sensing circuitry, for sensing when the temperature of quality indicator 700 lies within an acceptable temperature range, not less than a first predetermined low-temperature threshold $T_{low\ threshold}$ and not greater than a second predetermined high-temperature threshold $T_{high\ threshold}$. For this purpose, sensor 706 is a temperature sensor which sensor 106 may be set to any desired low-temperature threshold such as, by way of example, 2° C. as well as to any desired high-temperature and time threshold such as, by way of example, 8° C. for more than 12 hours.

Sensor 706 is preferably operative to prevent current flow through filaments 708, 709 at temperatures within the acceptable temperature range, to allow current flow through filament 708 at temperatures less than or equal to the low-temperature threshold and to allow current flow through filament 709 at temperatures greater than the high-temperature threshold for a given threshold period of time.

It is appreciated that although sensor 706 is illustrated herein as a single element, sensor 706 may alternatively be embodied as two or more individual sensors, individually respectively connected to first and second filaments 708 and 709 for control thereof.

In a further alternative embodiment of the present invention, second filament 709 may be obviated and sensor 706 may operate as a low-temperature sensor only, which sensor may be set to a given low-temperature threshold so as to control current flow to first filament 708. In this embodiment, exceedance of the high temperature threshold for a predetermined period of time by quality indicator 700 may be indicated by thermal paper 722 of display 720 independent of the output of circuitry 702, as will be further detailed henceforth with reference to FIGS. 10A and 10B.

In the second operational state of quality indicator 700 illustrated in FIGS. 8A and 8B, quality indicator 700 lies within an acceptable temperature range, for example between 2 and 8° C. In this state, current flow through electronic temperature sensor circuitry 702 is prevented by electronic sensor components 706, such that neither one of filaments 708 and 709 are heated. Thermal paper 722, located abutting filaments 708 and 709 and viewable through windows 738 and 740, is therefore not heated when quality indicator 700 is in this state and thus retains its original white appearance. Second and third transparent windows 738 and 740 thus remain white in this second operational state.

However, due to the removal of activation pull strip 712, first transparent window 734 is no longer backed by a black surface formed by activation pull strip 712 but rather by PCB layer 710, which PCB layer 710 is preferably white. First transparent window 734 therefore changes in appearance from black to white upon activation of quality indicator 700. As a result, first barcode 732 of which first transparent window 734 forms a part changes from the readable state shown in FIG. 7B to an unreadable state shown in FIG. 8B. Preferably simultaneously, second barcode 736 of which first transparent window 734 also forms a part changes from the unreadable state shown in FIG. 7B to a readable state shown in FIG. 8B.

It is understood that in the second operational state of quality indicator 700 a single barcode, namely second barcode 736 of tier II, is machine readable whereas all of the remaining barcodes of multiplicity of barcodes 730 are unreadable. Multiplicity of barcodes 730, including plurality of transparent windows 724 backed by thermal paper 722, therefore forms a heat-responsive visually sensible display, the scanning of which display by a conventional barcode scanner may be used to indicate that quality indicator 700 has been activated and lies within an acceptable temperature range.

Turning now to FIGS. 9A and 9B, illustrating a third operational state of quality indicator 700, upon quality indicator 700 falling to a temperature below $T_{low}$ threshold the exceedance of the low temperature threshold is preferably sensed by electric sensor circuitry 702, which circuitry 702 responsively allows current to flow to first filament 708. By way of example, the resistance of sensor 706 may change upon temperature T falling below $T_{low}$ threshold, such that current is allowed to flow to first filament 708, thereby selectively heating first filament 708. It is a particular feature of a preferred embodiment of the present invention that the falling of indicator 700 to below a threshold temperature thereof is output in the form of heat, in this case, by way of the heating of filament 708.

Upon first filament 708 becoming heated, filament 708 in turn heats thermal paper 722, which thermal paper 722 preferably undergoes a change in visual appearance thereupon. By way of example, as seen most clearly in FIG. 9A, thermal paper 722 may darken in a first region 750 thereof, which region 750 is preferably immediately proximal to filament 708.

As best appreciated from consideration of FIG. 9A, second transparent window 738 of multiplicity of barcodes 730 is preferably backed by first region 750, such that second transparent window 738 changes in appearance from white to black upon region 750 darkening, as seen in FIG. 9B. The blackening of transparent window 738 does not affect first barcode 732 and fourth barcode 744, neither of which barcodes 732 and 744 second transparent window 738 forms a part. Both of first and fourth barcodes 732 and 744 therefore remain unreadable in this third operational state. However, second barcode 736 of which second transparent window 738 forms a part changes from the readable state shown in FIG. 8B to an unreadable state shown in FIG. 9B. Preferably simultaneously, third barcode 742 of which second transparent window 738 also forms a part changes from the unreadable state shown in FIG. 8B to a readable state shown in FIG. 9B.

It is understood that in the third operational state of quality indicator 700 a single barcode, namely third barcode 742, is machine readable whereas all of the remaining barcodes of multiplicity of barcodes 730 are unreadable. Multiplicity of barcodes 730, including plurality of transparent windows 724 backed by thermal paper 722, therefore forms a heat-responsive visually sensible display, the scanning of which by a conventional barcode scanner may be used to indicate that quality indicator 700 has been activated and has exceeded a low-temperature threshold.

Reference is now made to FIGS. 10A and 10B illustrating the fourth operational state of quality indicator 700, in which fourth state quality indicator 700 rises to a temperature above $T_{high\ threshold}$ for longer than a given time, such as to above 8° C. for more than 12 hours. In this state, the exceedance of the high temperature threshold for a given period of time is preferably sensed by electronic sensor circuitry 702, which circuitry 702 responsively allows current to flow to second filament 709, thereby heating second filament 709.

Upon second filament 709 becoming heated, filament 709 in turn heats thermal paper 722, which thermal paper 722 preferably undergoes a change in visual appearance thereupon. By way of example, as seen most clearly in FIG. 10A, thermal paper 722 may darken in a second region 752 thereof, which second region 752 is preferably immediately proximal to second filament 709.

It is appreciated that thermal paper 722 may alternatively darken due to an increase in temperature of indicator 700, independent of an output of electronic temperature sensing circuitry 702. In this case, second filament 709 may be obviated and thermal paper 722 may darken in a non-localized manner upon indicator 700 rising to above a given temperature.

As best appreciated from consideration of FIG. 10A, third transparent window 740 of multiplicity of barcodes 730 is preferably backed by second region 752, such that third transparent window 740 changes in appearance from white to black upon the darkening of region 752 or of larger regions of thermal paper 722, as seen in FIG. 10B.

The blackening of transparent window 740 does not affect first barcode 732, which first barcode 732 therefore remains unreadable in this fourth operational state. However, third barcode 742 of which third transparent window 740 forms a part preferably changes from the readable state shown in FIG. 9B to an unreadable state shown in FIG. 10B. Preferably simultaneously, fourth barcode 744 of which third transparent window 740 also forms a part changes from the unreadable state shown in FIG. 9B to a readable state shown in FIG. 10B. It is appreciated that third transparent window 740 also forms a part of second barcode 736. Second barcode 736 preferably remains unreadable, notwithstanding the coloring of third transparent window 740.

It is appreciated that the fourth operational state of quality indicator 700 illustrated in FIGS. 10A and 10B corresponds to the case in which quality indicator 700 exceeds a high temperature threshold for a given period of time following exceedance of a low temperature threshold, as illustrated in FIGS. 9A and 9B. However, it will be understood that an alternative scenario is also possible, in which quality indicator 700 may exceed a high temperature threshold for a given period of time without prior exceedance of a low temperature threshold.

In the case that quality indicator 700 exceeds a high temperature threshold for a given period of time without prior exceedance of a low temperature threshold, region 752 of thermal paper 722 will darken due to the heating of filament 709 whereas region 750 of thermal paper 722 will remain blank. Third transparent window 740 backed by second region 752 of thermal paper 722 will therefore become opaque whereas second transparent window 738 will remain clear.

The coloring of third transparent window 740, which third transparent window 740 extends through second—fourth barcoded regions 736, 742 744, preferably causes fourth barcoded region 744 to change from an unreadable to a readable state, corresponding to the state of tier IV shown in FIG. 10B. Preferably simultaneously, the coloring of third transparent window 740 renders second and third barcode regions 736 and 742 unreadable, due to the coloring of a portion thereof. Additionally, first barcode 732 remains in an unreadable state.

It is understood that in the fourth operational state of quality indicator 700, upon exceedance of a high temperature threshold for a given period of time, a single barcode, namely fourth barcode 744 is machine readable whereas all of the remaining barcodes of multiplicity of barcodes 730 are preferably unreadable.

It is appreciated that this is the case irrespective of whether or not quality indicator 700 exceeded a low temperature threshold prior to the exceedance of the high temperature and time threshold, as illustrated in FIGS. 10A and 10B. The readability of fourth barcode 744 is thus indicative of quality indicator 700 having exceeded a high temperature and time threshold, but is not indicative of whether quality indicator 700 also exceeded a low temperature threshold prior thereto.

The modification of thermal paper 722 upon heating thereof is preferably irreversible, such that first and second regions 750 and 752 continue to appear opaque following exceedance of predetermined temperature thresholds as sensed and indicated by circuitry 702, independent of the present conditions to which quality indicator is subject. As a result, the scanning of barcodes 730 of quality indicator 700 serves to provide a visually sensible indication of possible exposure of quality indicator 700 to unacceptable temperature conditions, irrespective of the present state of the quality indicator.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A visually sensible indicator of temperature comprising:
   electronic temperature sensing circuitry sensing at least when a temperature exceeds at least one predetermined temperature threshold and providing at least one corresponding threshold exceedance output which is sensible as heat; and
   a heat-responsive visually sensible display which is responsive to said at least one threshold exceedance output for providing at least one visually sensible indication indicating that said temperature has exceeded said predetermined temperature threshold,
   said electronic temperature sensing circuitry comprising a heat-generating and heat-regulating element, said heat-generating and heat-regulating element being operative to generate said threshold exceedance output which is sensible as heat and to prevent overheating of said electronic temperature sensing circuitry.

2. A visually sensible indicator of temperature according to claim 1, wherein said visually sensible indication is human readable.

3. A visually sensible indicator of temperature according to claim 1, wherein said heat-responsive visually sensible display employs a thermochromic material.

4. A visually sensible indicator of temperature according to claim 1, wherein said visually sensible indication is machine readable.

5. A visually sensible indicator of temperature according to claim 4, wherein said visually sensible indication is at least a part of a bar code.

6. A visually sensible indicator of temperature according to claim 4, wherein said visually sensible indication is rendering a bar code unreadable.

7. A visually sensible indicator of at least one parameter, said indicator comprising:
   electronic sensing circuitry sensing at least when said at least one parameter exceeds a predetermined threshold and providing a threshold exceedance output which is sensible as heat; and
   a heat-responsive visually sensible display which is responsive to said threshold exceedance output for providing a visually sensible indication indicating that said at least one parameter has exceeded said predetermined threshold,
   said electronic sensing circuitry comprising a heat-generating and heat-regulating element, said heat-generating and heat-regulating element being operative to generate said threshold exceedance output which is sensible as heat and to prevent overheating of said electronic sensing circuitry.

8. A visually sensible indicator of at least one parameter according to claim 7, wherein said visually sensible indication is human readable.

9. A visually sensible indicator of at least one parameter according to claim 7, wherein said heat-responsive visually sensible display employs a thermochromic material.

10. A visually sensible indicator of at least one parameter according to claim 7, wherein said visually sensible indication is machine readable.

11. A visually sensible indicator of at least one parameter according to claim 10, wherein said visually sensible indication is at least a part of a bar code.

12. A visually sensible indicator of at least one parameter according to claim 10, wherein said visually sensible indication is rendering a bar code unreadable.

* * * * *